United States Patent
Thomas et al.

(10) Patent No.: US 12,026,723 B2
(45) Date of Patent: *Jul. 2, 2024

(54) ELECTRONIC PAYMENT NETWORK SECURITY

(71) Applicant: Ripple Luxembourg S.A., Luxembourg (LU)

(72) Inventors: Stefan Thomas, San Francisco, CA (US); Peter Krey, San Francisco, CA (US)

(73) Assignee: RIPPLE LUXEMBOURG S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,840

(22) Filed: Jan. 31, 2023

(65) Prior Publication Data
US 2023/0177526 A1  Jun. 8, 2023

Related U.S. Application Data

(63) Continuation of application No. 15/662,096, filed on Jul. 27, 2017, now Pat. No. 11,587,099.

(51) Int. Cl.
*G06Q 30/018* (2023.01)
*G06N 3/044* (2023.01)
(Continued)

(52) U.S. Cl.
CPC ........ *G06Q 30/0185* (2013.01); *G06N 3/08* (2013.01); *G06N 7/01* (2023.01); *G06N 3/044* (2023.01);
(Continued)

(58) Field of Classification Search
None
See application file for complete search history.

(56) References Cited

U.S. PATENT DOCUMENTS 6,253,186 B1   6/2001  Pendleton, Jr.
8,886,563 B2 * 11/2014 Sakata ............... G06Q 20/405
                                                  455/445
(Continued)

FOREIGN PATENT DOCUMENTS

WO    2014179690 A2   11/2014

OTHER PUBLICATIONS

Vaswani et al., "Attention is All you Need," Published in NIPS Jun. 12, 2017, Computer Science, 2017, arXiv:1706.03762v1 retrieved from https://doi.org/10.48550/arXiv.1706.03762 (Year: 2017).*

(Continued)

*Primary Examiner* — Jacob C. Coppola
*Assistant Examiner* — Eduardo Castilho
(74) *Attorney, Agent, or Firm* — Butzel Long

(57) ABSTRACT

Systems and techniques are provided for electronic payment network security. Payment data including an origin and a destination for a payment in an electronic payment network may be received. A route of the payment in the electronic payment network may be estimated based on the origin and the destination. The estimated route of the payment in the electronic payment network may be input to a neural network. Fraud probabilities may be determined using the neural network. A fraud probability may include a value indicating a probability of fraud in the payment in the electronic payment network.

19 Claims, 11 Drawing Sheets

(51) Int. Cl.
G06N 3/045 (2023.01)
G06N 3/08 (2023.01)
G06N 3/084 (2023.01)
G06N 7/01 (2023.01)

(52) U.S. Cl.
CPC ............. G06N 3/045 (2023.01); G06N 3/084 (2013.01); G06Q 2220/00 (2013.01)

(56) References Cited

U.S. PATENT DOCUMENTS

| | | | | |
|---|---|---|---|---|
| 10,002,348 | B1* | 6/2018 | Doctor | G06Q 20/401 |
| 11,127,004 | B2* | 9/2021 | Lorberg | G06Q 20/382 |
| 11,151,468 | B1 | 10/2021 | Chen | |
| 11,164,163 | B1* | 11/2021 | Viidu | G06Q 20/4016 |
| 11,587,099 | B2* | 2/2023 | Thomas | G06Q 30/0185 |
| 2004/0089711 | A1 | 5/2004 | Sandru | |
| 2008/0140576 | A1 | 6/2008 | Lewis | |
| 2009/0144213 | A1 | 6/2009 | Patil | |
| 2010/0145836 | A1* | 6/2010 | Baker | G06Q 20/40 706/54 |
| 2012/0005749 | A1 | 1/2012 | Zoldi | |
| 2012/0271765 | A1* | 10/2012 | Cervenka | G06Q 20/12 705/44 |
| 2013/0018795 | A1 | 1/2013 | Kolhatkar | |
| 2013/0024361 | A1 | 1/2013 | Choudhuri | |
| 2013/0185802 | A1 | 7/2013 | Tibeica | |
| 2016/0104163 | A1 | 4/2016 | Aquino | |
| 2016/0224949 | A1 | 8/2016 | Thomas | |
| 2016/0364794 | A1* | 12/2016 | Chari | G06Q 40/02 |
| 2017/0017935 | A1 | 1/2017 | Beaudoin | |
| 2017/0140382 | A1* | 5/2017 | Chari | G06Q 20/389 |
| 2017/0243177 | A1 | 8/2017 | Johnsrud | |
| 2018/0068395 | A1 | 3/2018 | Gupta | |
| 2018/0316722 | A1* | 11/2018 | Jenson | G06Q 30/0277 |
| 2020/0026992 | A1 | 1/2020 | Zhang | |

OTHER PUBLICATIONS

PCT International Search Report and Written Opinion for PCT/US18/43740, dated Oct. 15, 2018, 10 pages.

International Preliminary Report on Patentability for Application No. PCT/US2018/043740, dated Jan. 28, 2020, 8 pages.

E. Caldeira, G. Brandao, H. Campos and A. Pereira, "Characterizing and Evaluating Fraud in Electronic Transactions," 2012 Eighth Latin American Web Congress, 2012, pp. 115-122, doi: 10.1109/LA-WEB.2012.16 (Year: 2012).

Sequence to Sequence Learning with Neural Networks Ilya Sutskever, Oriol Vinyals, Quoc V. Le arXiv:1409.3215 [cs. CL] (Year: 2014).

Crisp, Kevin & Sutter, Ellen & Westerberg, Jacob. (2015). Pencil and-Paper Neural Networks: An Undergraduate Laboratory Exercise in Computational Neuroscience Journal of undergraduate neuroscience education : JUNE : a publication of FUN, Faculty for Undergraduate Neuroscience. 14. A13-22. (Year: 2015).

E. A. Lopez-Rojas and S. Axelsson, "A review of computer simulation for fraud detection research in financial datasets," 2016 Future Technologies Conference (FTC), 2016, pp. 932-935, doi: 10.1109/FTC.2016.7821715. (Year: 2016).

Jordan Neural networks: training with backpropagation. Jul. 2017; Retrieved from https://www.jeremyjordan.me/ neural-networks-training/ (Year: 2017).

Convolutional Sequence to Sequence Learning Jonas Gehring, Michael Auli, David Grangier, Denis Yarats, Yann N. Dauphin arXiv:1705.03122v3 [cs.CL] (Year: 2017).

Prihodko, Pavel et al. "Flare : An Approach to Routing in Lightning Network White Paper." (2016). (Year: 2016).

Ghosh and Reilly, "Credit card fraud detection with a neural-network," 1994 Proceedings of the Twenty-Seventh Hawaii International Conference on System Sciences, 1994, pp. 621-630, doi: 10.1109/HICSS.1994.323314. (Year: 1994).

E. L. Barse, H. Kvarnstrom and E. Jonsson, "Synthesizing test data for fraud detection systems," 19th Annual Computer Security Applications Conference, 2003. Proceedings., 2003, pp. 384-394, doi: 10.1109/CSAC.2003.1254343. (Year: 2003).

C. Phua, Vincent C. S. Lee, Kate Smith-Miles and Ross W. Gayler. "A Comprehensive Survey of Data Mining-based Fraud Detection Research., 2010, CoRR, arXiv:1009.6119 [cs.AI](or arXiv:1009.6119v1 [cs.AI] for this version) https://doi.org/10.48550/ arXiv.1009.6119" (Year: 2010).

K. Modi and R. Dayma, "Review on fraud detection methods in credit card transactions," 2017 International Conference on Intelligent Computing and Control (I2C2), 2017, pp. 1-5, doi: 10.1109/I2C2.2017.8321781. (Year: 2017).

J. Shaji and D. Panchal, "Improved fraud detection in e-commerce transactions," 2017 2nd International Conference on Communication Systems, Computing and IT Applications (CSCITA), 2017, pp. 121-126, doi: 10.1109/CSCITA.2017.8066537. (Year : 2017).

\* cited by examiner

ELECTRONIC PAYMENT NETWORK SECURITY

BACKGROUND

An electronic payment network may allow users to send and receive payments. The electronic payment network may include a number of systems which may be connected to form the electronic payment network. This may result in the electronic payment network being decentralized. A user may gain access to the electronic payment network through these systems. A payment made using the electronic payment network may be susceptible to fraud committed by the users involved in the payment, the payor and payee, or by any of the systems involved in the payment. Due to the decentralized nature of the electronic payment network, it may be difficult both to detect fraud in a payment and to make the identities of users or systems responsible for fraud available to other users and systems in the electronic payment network.

BRIEF SUMMARY

In an implementation, payment data including an origin and a destination for a payment in an electronic payment network may be received. A route of the payment in the electronic payment network may be estimated based on the origin and the destination. The estimated route of the payment in the electronic payment network may be input to a neural network. Fraud probabilities may be determined using the neural network. A fraud probability may include a value indicating a probability of fraud in the payment in the electronic payment network.

Systems and techniques disclosed herein may allow for electronic payment network security. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
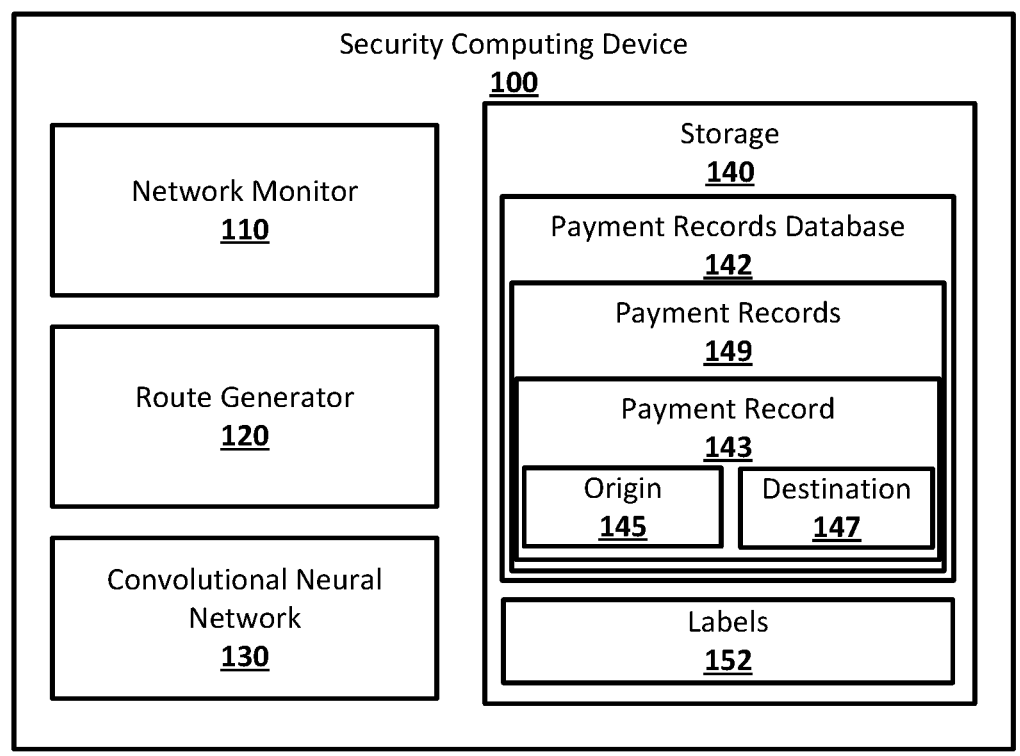
FIG. 1 shows an example system suitable for electronic payment network security according to an implementation of the disclosed subject matter.

According to embodiments disclosed herein, electronic payment network security may allow for the detection of fraud within an electronic payment network. An electronic payment network may include ledgers, which may be computer systems that track the ownership of resources by various parties in accounts, and connectors, which may be computer systems run by parties that control accounts on various ledgers within the electronic payment network. A user of the electronic payment network may affect a payment to another use of the electronic payment network. The payment may be routed through various ledgers and connectors. Payment records including data about payments that take place in the electronic payment network may be evaluated for indications of fraud using basic fraud checking and connectors may report fraudulent users to produce a training data set for a neural network. After the neural network has been trained, payment data from the electronic payment network may be input to the neural network as the payments occur. The neural network may determine a probability that the payment data indicates fraud in the payment. The probability of fraud may be stored in a database, and may be used to determine the risk levels of users, ledgers, and connectors involved in the payment. Payments with high probability of fraud may also result in further action being taken regarding the computer systems or parties responsible for the fraud.

A ledger system, or ledger, may be any suitable computing device or system, with any suitable combination of hardware and software, for tracking resources controlled by various parties. For example, a ledger may be a system run by a financial institution, a hardware or software component of a server system or computing device, or a distributed system, such as, for example, a cryptocurrency ledger or blockchain which may exist on a number of different computing devices and be reconciled in a collaborative fashion, or may be centralized. For example, the ledger may be the ledger system for a branch of a bank, and may track the control of all accounts held at that branch. A ledger may track the control of resources for any number of parties. A party may control an account on a ledger, which may track that party's resources on the ledger. Resource may be transferred into and out of an account on a ledger, for example, to send or receive payments. Accounts on a ledger may include an identification of the party and quantities of each type of resource controlled by the party and tracked by the ledger. The identification of the party may point to an identifiable person or organization, or may be an anonymous identification, such as, for example, an address hash on a cryptocurrency ledger. A party may have more than one resource type tracked by an individual ledger.

For example, a ledger that includes a blockchain for a cryptocurrency may include an account for each party, for example, individual or organization, which owns some quantity of the cryptocurrency. The account may identify the owner of the cryptocurrency, for example, using a cryptographic public key stored with the account, rendering the cryptocurrency accessible only to a party with the corresponding private key. The account may also include the quantity of cryptocurrency controlled by the party. A ledger for a financial institution may be hosted on a server system controlled by that financial institution. The ledger may track accounts owned by account holders at the financial institution, and may track the various assets owned by the account holder and tracked by the financial institution. For example, an account for a party may include a type and quantity of one or more currencies and types and quantities of other types of assets, such as stocks, bonds, certificates of deposit, and the like. Alternatively or in addition, accounts may include or record ownership of other resources, such as commodities or any resource that may be commoditized, finished physical goods, raw materials, computing resources, real property, or any other resource that may be owned by an entity and transferred from one entity to another. The account holder may be identified by any suitable information, and may need proof of identity, such as, for example, a username and password for the account, in order to access the account. A ledger for a server system may be, for example, some suitable combination of hardware and software for tracking resources and ownership of those resources on the server system. For example, the ledger for a server system may track computing resources such as storage space or processor time owned by various users of the server system, where the users may be physical individuals or organizations, or virtual users of a system, such as system accounts, or other processes running on the server system.

A ledger may track any type of resource. For example, a resource may be a currency, cryptocurrency, financial instrument, commodity, or computational resource such as processor time, volatile and non-volatile storage space, and network bandwidth. The record of ownership and quantity of a resource tracked by the ledger may also be the resource itself, or may be a record of ownership of a resource that exists separately. For example, in a ledger that is a blockchain for a cryptocurrency, the record of ownership for some quantity of the cryptocurrency may be the cryptocurrency. In a ledger that tracks ownership of commodities, the record of ownership may correspond to physical resources, for example, gold, oil, or other commodities, that exist separately. Such resources may be transferred by transferring ownership, though the physical instantiation of the resource may not necessarily be moved.

An electronic payment network may include connectors to facilitate payments between users who hold accounts on different ledgers. A connector, or connector system, may be implemented using any suitable combination of hardware and software on any suitable computing device, and may be controlled by any suitable party. The party controlling a connector may have accounts on any number of the ledgers, connecting those ledgers in the electronic payment network. Connectors may be able to communicate with each other and with ledgers in any suitable manner, such as, for example, using a network connection, such as a WAN or LAN connection, or internal bus connection, for example, within a computing system. A common communication protocol may be used in communication among connectors, and between connectors and ledgers, to allow connectors to set up and execute payments within the electronic payment network.

Connectors may be used to allow for a payment to be made across ledgers in an electronic payment network without requiring the actual transfer of resources, such as money, from one ledger to another. Connectors may also allow payments that are cross-resource, for example, with a payor paying in a first currency while the payee receives a second currency. For example, a payor may control an account on the ledger of a branch of a bank in the United States. The payor's account may be denominated in US dollars. The payor may wish to send payment to a payee at the payee's account at a branch of a European bank. The payee's account may be denominated in Euros. A connector may have an account on the ledger of the same branch of the bank in the US as the payee, and on the ledger of the same branch of the bank in Europe as the payee. The payment may be affected by the connector by transferring an appropriate quantity of US dollars from the payor's account on the ledger at the branch of the bank in the US to the connector's account on the same ledger, and by transferring an appropriate quantity of Euros from the connector's account on the branch of the bank in Europe to the payee's account on the same ledger. These transfers may be affected on each ledger through appropriate incrementing and decrementing of the quantity of US dollars and Euros in the accounts on the ledgers, allowing the payment to be made to the payee across currencies and ledgers without communication or transfer of currency between the ledgers.

A payment in the electronic payment network may incorporate any number of connectors and any number of ledgers. For example, when a payor with an account on one ledger wishes to make a payment to a payee with an account on another ledger in the electronic payment network and there is no connector with accounts on the same ledger as both the payee and payor, additional connectors and ledgers may be incorporated into the payment. The route used by a payment may be made of any suitable number of segments, with each segment representing one connector and two ledgers connected by the one connector. Any suitable pathfinding algorithm, using any suitable criteria, may be used to determine the appropriate connectors and ledgers in the electronic payment network to affect a payment from the payor to the payee. For example, a pathfinding algorithm may account for exchange rates used by various connectors when a payment will involve different resource, for example, as in cross-currency payments, and fees that may be charged by the various connectors and ledgers. The pathfinding algorithm may also incorporate any available data about the trustworthiness of the various connectors and ledgers.

For example, a payor may control an account on the ledger of a branch of a bank in the United States. The payor's account may be denominated in US dollars. The payor may wish to send payment to a payee at the payee's account at a branch of a European bank. The payee's account may be denominated in Euros. There may be no connector with an account on the ledger of the same branch of the bank in the US as the payor and on the ledger of the same branch of the bank in Europe as the payee. There may be a first connector with an account on the ledger of the same branch of the bank in the US as the payor and an account on a cryptocurrency ledger, and a second connector with an account on the ledger of the same branch of the bank in Europe as the payee and an account on the cryptocurrency ledger. The payment may be affected by the connectors in the electronic payment network by transferring an appropriate quantity of US dollars from the payor's account on the ledger at the branch of the bank in the US to the first connector's account on the same ledger, transferring an appropriate quantity of cryptocurrency from the first connector's account on the cryptocurrency ledger to the second connector's account on the cryptocurrency ledger, and transferring the appropriate quantity of Euros from the second connector's account on the ledger of the branch of the bank in Europe to the payee's account on the same ledger.

Payments in the electronic payment network may be settled in any suitable manner. The transfers on each ledger in a payment may occur in any suitable order when settling a payment, and may utilize any suitable mechanisms, such as holds on resources in accounts, to facilitate the transfers and the overall payment. For example, a payment may be settled through simultaneous instructions to all ledgers in the payment to transfer resources between accounts to settle the payment. A payment may also be settled through instructions sent to the ledgers sequentially. With sequential instructions, a ledger closest in the payment to the payee may transfer resources between accounts first, and successful completion of the transfer may result in instructions sent to the next ledger in the payment that is one step closer to the payor, sequentially until the ledger next to the payor is instructed to complete its transfer on successful completion of a transfer by a ledger one step from the payor. The sequence may also proceed from the ledger next to the payor to the ledger next to the payee.

The electronic payment network may be de-centralized and user generated. Connectors may be set up and operated by any suitable party, which may open accounts on any suitable ledgers, thereby incorporating those ledgers into the electronic payment network. The electronic payment network may thus expand whenever new connectors are set up, and whenever extant connectors add accounts on ledgers that are not part of the electronic payment network. A newly set up connector may connect itself to the electronic payment network by setting up an account on any number of ledgers that are already connected to the electronic payment network, thereby connecting itself to those ledgers. The new connector may then also establish accounts on ledgers that were not yet part of the electronic payment network, connecting those ledgers to the electronic payment network. Connectors may also open accounts on ledgers that are already part of the electronic payment network, establishing additional connections and creating new routes through the electronic payment network.

Users may be any parties which may use the electronic payment network to send and receive payments. A user may have accounts on any number of ledgers in the electronic payment network, and may access the electronic payment network through connectors which have accounts on the same ledgers as the user. To initiate a payment, a user may need to select and register with a connector so that the connector can issue the appropriate instructions to a ledger to transfer resources out of a user's account. A user may be, for example, a person, group, organization, or computer hardware and software, such as an automated system or program, using any suitable computing device or system to communicate with ledgers and connectors in the electronic payment network. For example, a user may be a person using a computing device such as a laptop to initiate a payment in the electronic payment network. The user's computing device may use any suitable wired or wireless connection to communicate with connector and ledgers. The connection may be a network connection, such as a WAN or LAN connection, or may be an internal bus connection, for example, within a computing system.

Payments in the electronic payment network may carry the risk of fraud. For example, a payment may be made from a payor to a payee in the electronic payment network with the expectation that the payor will receive physical goods shipped by the payee, or access to digital goods provided by the payee. The payee may accept payment from the payor, but may not ship the physical goods or provide access to the digital goods, or may ship goods or provide digital goods that are different than those the payor made payment for. A payee may provide goods paid for by the payor, but the payor may issue a chargeback and claim to have not received the goods. The chargeback may result in a refund to the payor from the first connector used to make the payment through the electronic payment network. A malicious actor may take over a user's account on a ledger or a connector, and may use the account to make fraudulent payments or defraud other users who make payments to the account. Some payments in the electronic payment network may be handled automatically by a user agent, such as, for example, a plug-in for a web browser. For example, micropayments for access to internet content may be handled automatically by a web browser plug-in as the user uses the web browser to access the content. User agents may malfunction in various ways, resulting in payments that may appear fraudulent. An interloper may interfere with a payment. For example, an interloper may intercept the instructions for a payment after the payment is initiated by a payor. The interloper may alter the instructions, for example, changing the payee or payment amount. This interloper may, for example, redirect the payment to themselves.

A neural network may be trained to determine the probability that a payment in the electronic payment network is fraudulent. Payment records may be gathered on payments that have taken place in the electronic payment network. The payment records may be evaluated for fraud according to basic fraud checking criteria, for example, based on known data about the payor or payee in the payment, such as name, address, and credit history. A connector in the electronic payment network may also report fraudulent payments when the connector determines that it has been used in fraudulent payment, for example, by a malicious actor that has registered to use the connector. Any suitable number of payment records may be evaluated for fraud, and may be assigned labels which may include indications of the likelihood of fraud. This may establish a training data set for fraudulent payments in the electronic payment network. The label for a payment record may be a binary label, for example, indicating whether a payment record is for a fraudulent payment or a non-fraudulent payment, or may be a probability, indicating the probability that the payment record is for a fraudulent payment. The label may also include multiple probabilities or multiple binary indicators, which may be indications of the probability that each party to the payment, for example, users who are the payor and payee, connectors, and ledgers, are responsible for fraud, or a binary fraud determination for each party. For example, a payment record for a payment that used two connectors and three ledgers may have label that includes seven probabilities, one for the payor, one for the payee, and one for each connector and ledger. The label may also include an indication of the type of fraud that may be present in a payment.

The payment records for a payment may include, for example, identification data for the users who are the payor and payee in the payment, time the payment occurred, the size of the payment, any resources, such as currencies, used to settle the payment, the manner in which the payment was settled in the electronic payment network, the purpose of the payment, for example, whether the payment is for physical goods, digital goods, or services, and an identification of the goods or services, whether the settlement was later charged back by the payor and if so, how long after the payment settlement the chargeback occurred, any input a user, for example, payor, may have made into form fields of a web page displayed by a web browser running on a computing device in order to initiate the payment, data about the web browser used to initiate the payment, including, for example, installed, plug-ins, and data about the operating system of the computing device running the web browser. The identification data for the users who are the payor and payee in the payment may directly identify the users, for example, as individual persons, groups, businesses, or other organizations, or may be addresses, such as, for example, an address hash on a cryptocurrency ledger which may be unique to a user, but may not directly identify any individual persons, groups, businesses, or other organizations. A payment record may or may not include the entirety of the route through the electronic payment network used by the payment. Because the electronic payment network may be de-centralized and user generated, no entity may have a view of all the ledgers and connectors, and the connections between them, in the electronic payment network. Some payment records may include complete route data, including identification of the ledgers and connectors involved in the payment, while other payment records may only include identification of certain ledgers and connectors, such as, for example, the ledgers and connectors at the beginning and end of the payment. The identification of the ledgers and connectors may include any suitable data, such as, for example, an identification of parties the control or run the ledgers and connectors and a geographic location of computing devices that implement the ledgers and connectors.

The payment records and their labels may be used to a train the neural network. The neural network may be of any suitable type, and may be, for example, a convolutional neural network which may be sequence to sequence, or may have a sequence input but a single output. For example, the neural network may be divided into two sub-neural networks, an encoder neural network and a decoder neural network. The encoder neural network may be, for example, a recurrent neural network which may use a long short-term memory structure, and the decoder neural network may be, for example a recurrent neural network, or may be a non-recurrent neural network of any suitable structure. The neural network may include any suitable mechanisms, such as an attention mechanism, and structure, including, for example, multiple hidden layers.

Before being input into the neural network, payment records which do not have a complete route for the payment may have an estimated route generated. The estimated route may be a best estimate of the route the payment took based on data available in the payment record, any available data about the topology of the electronic payment network, and any available data about the pathfinding algorithm used to route payments through the electronic payment network. Because no party may have a complete view of the topology of the electronic payment network due to the user-generated nature of the electronic payment network, the estimated route for a payment may differ from the route the payment actually took.

Payment records may be input to the neural network in any suitable format. For example, a payment record may be input based on the segments of the route, or estimated route, for the payment record. For example, each segment may be represented as a vector of integers, with the integers representing unique identifiers for the connector and ledgers involved in the segment of the payment. Integers representing a ledger or connector may be consistent across all payment records that include the ledger or connector, and may function as an identifier for the ledger or connector within the electronic payment network. The vector for a segment may also include representations for other aspects of the payment, including, for example, identifiers for the payor and payee, amount and type of resources involved in the segment, geographic locations of the connectors and ledgers, and any other data available in the payment record. Other data from the payment record, such as the identities of the payor and payee for the payment, and the total amount of the payment, may be represented in each of the segment vectors, in separate segment vectors, for example, with the payor represented in the first segment vector and the payee represented in the last segment vector, or may be represented in a separate vector from the segment vectors. For a payment record with more than one segment, a vector representing one of the segments may be applied to the input layer of an encoder neural network of the neural network, and then the vector representing the next segment may be applied to the input of the encoder neural network while the hidden layer of the encoder neural network is also applied due to the recurrent nature of the encoder neural network, until all segments have been applied to the input of the encoder neural network. This may result in the hidden layer of the encoder neural network being an encoded vector representation of all the segments of the route for the payment record, as well as any other data from the payment record input to the encoder neural network. The segments may be applied to the input of the encoder neural network in any suitable order. For example, the segments may be applied in order from payor to payee, or from payee to payor.

After all the segments of the route for the payment in the payment record have been applied to the encoder neural network, the hidden layer of the encoder neural network may be applied to the input layer of the decoder neural network of the neural network. The decoder neural network may output a single value, which may be, for example, a probability that, or binary indicator of whether, the payment in the payment record involves fraud. The decoder neural network may also output multiple values, for example, one value for each party to the payment that indicates the probability that, or is a binary indicator of whether, the party is responsible for fraud in the payment. The multiple values may be output at once, for example, as a vector, or may be output in sequence based on recurrence in the decoder neural network. For example, the decoder neural network may recur with the hidden layer of the decoder neural network being input back into the decoder neural network along with the hidden layer of the encoder neural network and the previous output of the decoder neural network, until the decoder neural network outputs a stop signal indicating the end of the output. This may allow the decoder neural network to output multiple values, for example, fraud probabilities, in sequence. The decoder neural network may also output a value which may indicate the type of fraud that may be present in the payment.

The fraud probabilities output by the neural network for a payment record may be compared to the fraud probabilities in the label for the payment record to determine a level of error for the neural network. For example, adjustments to the weights of the various layers of the neural network may be determined and applied to the neural network, adjusting the weights of the neural network. The level of error and weight adjustments may be determined in any suitable manner, such as, for example, by using backpropagation. If the labels for the payment records include an indication of the type of fraud that may be present in the payment, the level of error may also incorporate any errors in the output of the neural network indicating the type of fraud. The neural network may be trained using any suitable number of payment records, which may be input to the neural network any suitable number of times. For example, the neural network may be trained using the payment records until it has achieved some target level of error in the output probabilities of fraud for the payment records being used to train the neural network. Some percentage of payment records may be used to test the neural network to determine if it has achieved a desired level of error, and may not be used to determine weight adjustments for the neural network, for example, to help avoid overfitting of the neural network.

After the neural network has been trained, the neural network may be used to provide security to the electronic payment network. The payment data for payments taking place within the electronic payment network may be received at the neural network, which may be hosted on a computing device or devices, such as, for example, a server system, connected to the electronic payment network, and may be security system for the electronic payment network. For example, the neural network may be hosted on a server system associated with a connector or ledger of the electronic payment network. The payment data may be sent to the security system by various connectors in the electronic payment network, or may be gathered in any other suitable manner by the security system, including through active monitoring of communication in the electronic payment network. The payment data may include any of the data that may be included in a payment record, but may be not be associated with any labels indicating fraud probabilities, and may be for payments that are occurring contemporaneously in the electronic payment network, so may not include any chargeback information depending on how soon after the completion of the payment the payment data is sent to the neural network.

Payment data received at the security system may not include the complete route of the payment through the electronic payment network. Before being input into the neural network at the security system, an estimated route may be generated based on the payment data. The estimated route may be a best estimate of the route the payment took based on the payment data, any available data about the topology of the electronic payment network, and any available data about the pathfinding algorithm used to route payments through the electronic payment network. Because the security system may not may have a complete view of the topology of the electronic payment network due to the user-generated nature of the electronic payment network, the estimated route for a payment may differ from the route the payment actually took.

Payment data for a payment may be input into the neural network, for example, in the same manner as payment records. The segments of the route of the payment in the payment data may be input to the encoder neural network in the same manner as the segments from payment records. For example, each segment of the payment may be represented as a vector of integers, along with other suitable data about the payment from the payment data. The vectors representing the segments of the of payment may be input sequentially to the encoder neural network. After the last segment of the payment is input to the encoder neural network, the hidden layer of the encoder neural network, which may be a vector, may be an encoded representation of the payment data, including the route taken by the payment through the electronic payment network and any other payment data included in the input vectors.

The hidden layer of the encoder neural network may be applied to the input layer of the decoder neural network of the neural network. The decoder neural network may output a single value, which may be, for example, a probability that, or binary indicator of whether, the payment in the payment record involves fraud. The decoder neural network may also output multiple values, for example, one value for each party to the payment that indicates the probability that, or is a binary indicator of whether, the party is responsible for fraud in the payment. The multiple values may be output at once, or may be output in sequence based on recurrence in the decoder neural network. For example, the decoder neural network may recur with the hidden layer of the decoder neural network being input back into the decoder neural network along with the hidden layer of the encoder neural network and the previous output of the decoder neural network. The decoder neural network may also output an indication of the type of fraud that may be present in the payment.

The fraud probabilities output by the neural network based on received payment data may be used in any suitable manner. For example, the fraud probabilities may indicate a high probability that the ledger account of the payor in the payment has been taken over from its original owner by a malicious actor who acted as the payor in the payment. The malicious actor may have registered at a connector, and used the connector to initiate the payment from the taken over ledger account. The original owner of the ledger account may be notified, for example, through any suitable form of electronic communication, and may be assisted in regaining control of their ledger account or in setting up a new ledger account while the compromised ledger account is closed. Suitable action may also be taken regarding the malicious actor and the connector used to initiate the payment from the taken over account. The fraud probabilities may also result in an account on the ledger being suspended rather than closed, or certain services usable through that account may be suspended. For example, the ability to make a payment using an account may be suspended, while other services of the account may remain usable. The ledger on which the account was taken over, and other ledgers in the payment, may reject the payment based on the fraud probabilities. An automatic or manual review of the payment may also be initiated.

The fraud probabilities may indicate a high probability the connector account of the payor in the payment has been taken over from its original owner by a malicious actor and used to initiate payment from a ledger account that belonged to the original owner of the connector account. The malicious actor may have compromised the connector account, and used the connector to initiate the payment from the original owner's ledger account, as the connector account may be authorized to make payment from the original owner's ledger account. The original owner of the connector account may be notified, for example, through any suitable form of electronic communication, and may be assisted in regaining control of their connector account or in setting up a new connector account while the compromised connector account is closed. Suitable action may also be taken regarding the malicious actor. The fraud probabilities may also result in an account on the connector being suspended rather than closed, or certain services usable through that account may be suspended. For example, the ability to initiate a payment using an account may be suspended, while other services of the account may remain usable.

The fraud probabilities may indicate a high probability that the payor initiated a fraudulent payment from their own connector account and ledger account and that the connector account and ledger account have not been compromised by another party. The connector account and ledger account may be closed automatically, for example, based on communication between the security system and connector with which the user is registered and the ledger on which the ledger account resides. Other actions taken by the security system may include, for example, sending communications to a connector to refund a payment to the payor when the payee has committed fraud and sending communications to a payee to not honor a fraudulent payment committed by a payor. The security system may also send communications to ledgers and connectors when necessary, for example, to warn them of fraud detected in payments in which they were part of the route the payment took through the electronic payment network. The fraud probabilities may be stored in a database on the security system. The database may, for example, store payment data and associated fraud probabilities for archival and reference purposes. The fraud probabilities may also result in an account on the ledger and connector being suspended rather than closed, or certain services usable through the accounts may be suspended. The ledger used to initiate the payment, and other ledgers in the payment, may reject the payment based on the fraud probabilities. An automatic or manual review of the payment may also be initiated.

The security system may also include a database of known users, ledgers, and connectors in the electronic payment network. For example, connectors may voluntarily register with the security system, and may voluntarily provide the identification of their registered users to the security system. Additionally, users may be fingerprinted in the electronic payment network based on data collected from the user's computing device when the user initiates a payment, such as, for example, the web browser used by a user to initiate the payment, plug-ins installed on the web browser, data entered into form fields in the web browser by the user to initiate the payment, the operating system in which the web browser is running, and any other possible identifying information for a user that may be gathered when the user initiates a payment. This data may not be able to identify the user as a particular person, group, business, or other organization but may be used to collate the user's payments in the electronic payment network so that the security system may determine which payments belong to the same user and to associate a risk score with the user based on their payment history and the fraud probabilities detected in the user's payments.

The security system may store a database of users, based on their fingerprints in the electronic payment network or other identifying data, and their associated risk scores. A new user may have a low risk score. If a user is seen to be registering with a number of connectors in the electronic payment network, for example, based on payment data or on voluntary reporting by the connectors, the user's risk score may increase. If payments in which the user is involved are determined by the neural network to have fraud probabilities indicating a high probability that the user is committing fraud in payments they initiate or receive, the user's risk score may increase further. Connectors may be able to access the database of users on the security system. For example, when a user tries to register at a connector, the connector may check the user's risk score in the database of the security system, and may refuse to allow the user to register if their risk score is too high. Similarly, a ledger, such as a cryptocurrency ledger, may also prevent a user from establishing an account if their risk score is too high.

The security system may also store a database of connectors and ledgers, which may also have associated risk scores. For example, when the fraud probabilities output by the neural network indicate that a payment is likely fraudulent, and the payment was routed through a specific ledger or connector, the risk score for that ledger or connector may increase. Connectors may avoid connecting to a ledger with a high risk score, and ledgers may avoid being connected to by a connector with a high risk score, in order to avoid being involved in fraudulent payments. Users who register with connectors, or frequently use ledgers, with high risk scores may have their risk scores increased.

Communication between the computing devices and systems may occur directly, for example, between any of the connectors and ledgers, or may be routed in any suitable manner. Communications may occur directly using any suitable communications protocols, such as, for example, HTTPS. In some implementations, instead of messages being sent by one computing device or system to another, a computing device or system may check for a message on another computing device or system. Computing devices and system may communicate using any suitable communications hardware, including, for example, any suitable wired and wireless network adapters.

FIG. 1 shows an example system suitable for electronic payment network security according to an implementation of the disclosed subject matter. A security computing device 100 may include a resource path monitor 110, a route generator 120, a convolutional neural network 130, and a storage 140. The security computing device 100 may be any suitable computing device, such as, for example, a computer 20 as described in FIG. 8, or component thereof, for implementing the resource path monitor 110, the route generator 120, the convolutional neural network 130, and the storage 140. The security computing device 100 may be a single computing device, or may include multiple connected computing devices, and may be, for example, a laptop, a desktop, an individual server, a server farm, or a distributed server system, or may be a virtual computing device or system. The security computing device 100 may be part of a computing system and network infrastructure, or may be otherwise connected to the computing system and network infrastructure. The network monitor 110 may be any suitable combination of hardware and software on the security computing device 100 for monitoring payments in an electronic payment network. The route generator 120 may be any suitable combination of hardware and software on the security computing device 100 for generating an estimated route for a payment in the electronic payment network. The convolutional neural network 130 may be any suitable combination of hardware and software on the security computing device 100 for implementing a convolutional neural network. The storage 140 may be any suitable hardware storage with any suitable software on, or accessible to, the security computing device 100, and may store a payment records database 142 and labels 152.

The network monitor 110 may be any suitable combination of hardware and software on the security computing device 100 for monitoring payments in the electronic payment network. The network monitor 110 may monitor any electronic payment network, with any suitable number of ledgers and connectors. The network monitor 110 may be able to determine the origin and destination of payments within the electronic payment network, including, for example, the payor who originates the payment, and the payee who receives the payment. The network monitor 110 may also be able to determine all or parts of the path of the payment through the electronic payment network, for example, depending on the visibility of the connectors and ledgers involved in the payment to the network monitor 110, or the voluntary reporting of the payment by the connectors and ledgers to the network monitor 110. The network monitor 110 may monitor the resource transfer network using, for example, a connection between the security computing device 100 and a public or private communications network on which computing devices for the connectors and ledgers of the electronic payment network. The network monitor 110 may monitor the electronic payment network through active monitoring of the activity of the computing devices and communications in the electronic payment network, or through passive monitoring, for example, being sent reports of activity of the computing devices in the electronic payment network by the computing devices, or by other security computing devices. The network monitor 110 may store data on monitored payments in the payment records database 142 stored in the storage 140, for example, as payment records 149.

The route generator 120 may be any suitable combination of hardware and software on the security computing device 100 for generating an estimated route for a payment in the electronic payment network. The payment records 149 stored based on payments monitored by the network monitor 110 may not include complete routes for the payments. For example, a payment record 143 may include an origin 145, indicating the origin of the payment in the electronic payment network, which may be an identification of the payor, and a destination 147, indicating the destination of the payment in the electronic payment network, which may be an identification of the payee, but may not include any other information about connectors and ledgers that were part of the route for the payment. The route generator 120 may generate an estimated route for payment records that do not have complete routes. The estimated route may be a best estimate of the route the payment took based on data available in the payment record, for example, the origin 145 and destination 147 of the payment record 143, any available data about the topology of the electronic payment network, and any available data about the pathfinding algorithm used to route payments through the electronic payment network. Because no party may have a complete view of the topology of the electronic payment network due to the user-generated nature of the electronic payment network, the estimated route for a payment may differ from the route the payment actually took.

The convolutional neural network 130 may be any suitable combination of hardware and software on the security computing device 100 for implementing a convolutional neural network. For example, the convolution neural network 130 may be an implementation of a sequence to sequence neural network, or a sequence input to single output neural network. The convolutional neural network 130 may be divided into two sub-neural networks, an encoder neural network and a decoder neural network. The encoder neural network may be, for example, a recurrent neural network which may use long short-term memory structure, and the decoder neural network may be, for example a recurrent neural network, or may be a non-recurrent neural network of any suitable structure. The convolutional network 130 may include any suitable convolutional layers at any suitable locations in the structure of the convolutional neural network 130. The convolutional network 130 may be designed to receive, as input, a payment record, such as the payment record 143, including a complete, or estimated, route, and to output fraud probabilities for the payment described by the payment record.

The storage 140 may be any suitable hardware storage and any suitable software, may be on, or accessible to, the security computing device 100, and may store a payment records database 142 and labels 152. The payment records database 142 may store the payment records 149, which may include payment records such as the payment record 143, for payments made using the electronic payment network. The payment record 143 may include the origin 145, indicating the origin of the payment in the electronic payment network, for example, identifying the user who is the payor, and the destination 147, indicating the destination of the payment in the electronic payment network, for example, the user who is the payee. The identification data for the users who are the payor and payee in the payment may directly identify the users, for example, as individual persons, groups, businesses, or other organizations, or may be addresses, such as, for example, an address hash on a cryptocurrency ledger which may be unique to a user, but may not directly identify any individual persons, groups, businesses, or other organizations. They payment record 143 may also include a time the payment occurred, the size of the payment, any resources, such as currencies, used to settle the payment, the manner in which the payment was settled in the electronic payment network, the purpose of the payment, for example, whether the payment is for physical goods, digital goods, or services, and an identification of the goods or services, whether the settlement was later charged back by the payor and if so, how long after the payment settlement the chargeback occurred, any input a user, for example, payor, may have made into form fields of a web page displayed by a web browser running on a computing device in order to initiate the payment, data about the web browser used to initiate the payment, including, for example, installed, plug-ins, and data about the operating system of the computing device running the web browser. The payment records database 142 may store any number of the payment records 149. The labels 152 may be labels generated for any number of the payment records 149 indicating fraud probabilities for those payment records. The labels 152 may be generated by evaluating the payment records 149 for fraud according to basic fraud checking criteria, for example, based on known data about the payor or payee in the payment, such as name, address, and credit history.

Figure 2A:
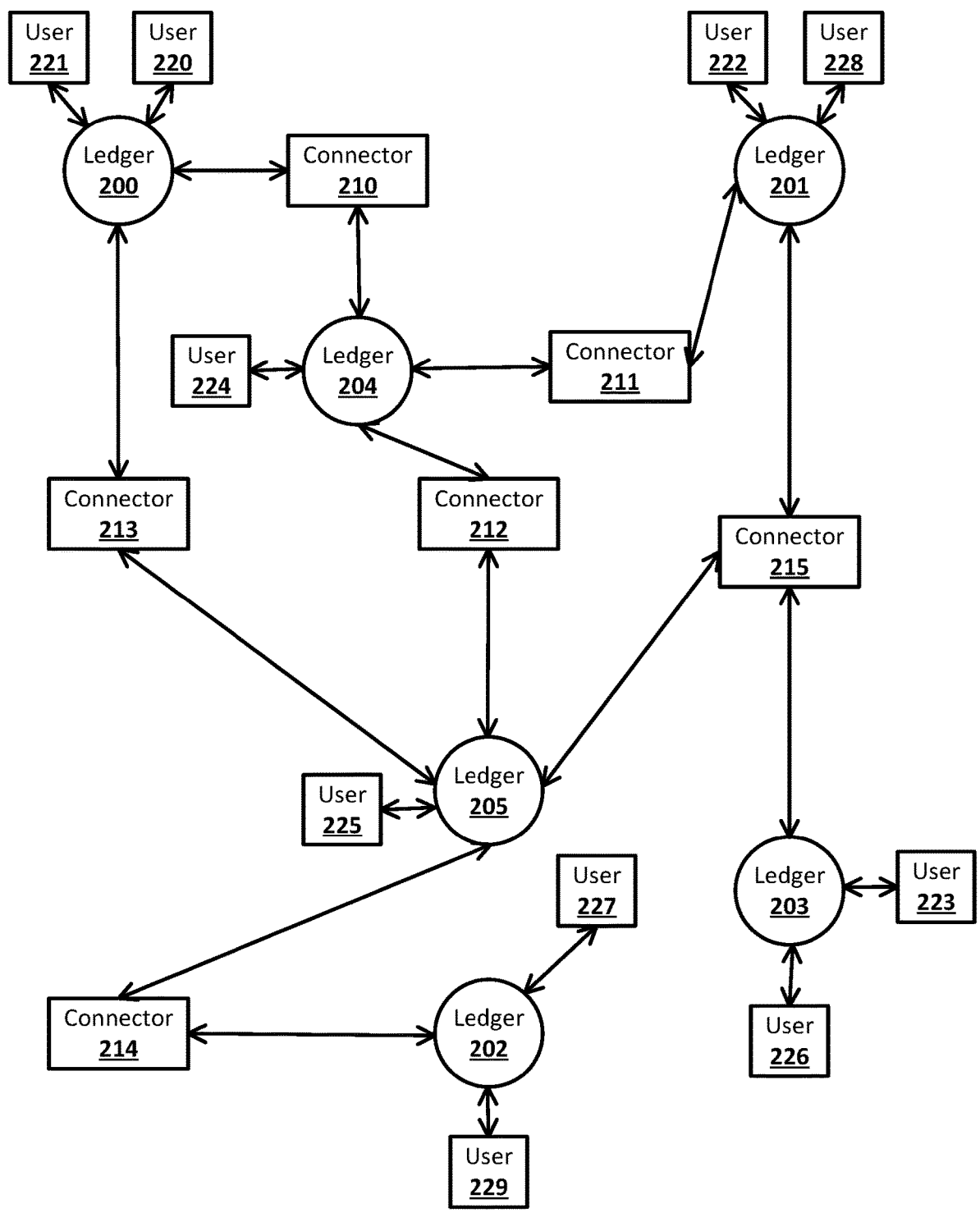
FIG. 2A shows an example system suitable for electronic payment network security according to an implementation of the disclosed subject matter.

FIG. 2A shows an example system suitable for electronic payment network security according to an implementation of the disclosed subject matter. An electronic payment network may be formed from any number of ledgers, such as ledgers 200, 201, 202, 203, 204, and 205, and connectors, such as connectors 210, 211, 212, 213, 214, and 215. The electronic payment network may be used by any number of users, such as users 220, 221, 222, 223, 224, 225, 226, 227, 228, and 229, to send and receive payments. The users 220, 221, 222, 223, 224, 225, 226, 227, 228, and 229 may have accounts on any of the ledgers 200, 201, 202, 203, 204, and 205, and may register with any of the connectors 210, 211, 212, 213, 214, and 215. Users who only receive payments may not need to register with a connector in order to receive payments in the electronic payment network.

A ledger, such as any of the ledgers 200, 201, 202, 203, 204, and 205, may be any suitable computing device or system, with any suitable combination of hardware and software, for tracking resources controlled by various parties. For example, a ledger may be a system run by a financial institution, a hardware or software component of a server system or computing device, or a distributed system, such as, for example, a cryptocurrency ledger or blockchain which may exist on a number of different computing devices and be reconciled in a collaborative fashion, or may be centralized. For example, the ledger may be the ledger system for a branch of a bank, and may track the control of all accounts held at that branch. A ledger may track the control of resources for any number of parties, such as, for example, any of the users 220, 221, 222, 223, 224, 225, 226, 227, 228, and 229. A party may control an account on a ledger, which may track that party's resources on the ledger. Resource may be transferred in and out of an account on a ledger, for example, when to send or receive payments. Accounts on a ledger may include an identification of the party and quantities of each type of resource controlled by the party and tracked by the ledger. The identification of the party may point to an identifiable person or organization, or may be an anonymous identification, such as, for example, an address hash on a cryptocurrency ledger. A party may have more than one resource type tracked by an individual ledger.

A connector, such as any of the connectors 210, 211, 212, 213, 214, and 215, may be may be implemented using any suitable combination of hardware and software on any suitable computing device, and may be controlled by any suitable party, and may allow for a payment to be made across ledgers in an electronic payment network without requiring the actual transfer of resources, such as money, from one ledger to another. The party controlling a connector may have accounts on any number of the ledgers 200, 201, 202, 203, 204, and 205, connecting the ledgers on which the connector has accounts. Connectors may be able to communicate with each other and with ledgers in any suitable manner, such as, for example, using a network connection, such as a WAN or LAN connection, or internal bus connection, for example, within a computing system. A common communication protocol may be used in communication among the connectors 210, 211, 212, 213, 214, and 215, and between the connectors 210, 211, 212, 213, 214, and 215 and the ledgers 200, 201, 202, 203, 204, and 205, to allow the connectors 210, 211, 212, 213, 214, and 215 to set up and execute payments within the electronic payment network.

A user, such as any of the users 220, 221, 222, 223, 224, 225, 226, 227, 228, and 229, may be a party which may use the electronic payment network to send and receive payments. A user may have accounts on any number of ledgers, such as the ledgers 200, 201, 202, 203, 204, and 205, in the electronic payment network, and may access the electronic payment network through connectors, such as the connectors 210, 211, 212, 213, 214, and 215, which have accounts on the same ledgers as the user. For example, the user 221 may control an account on the ledger 200, the user 220 may control a different account on the ledger 200, and the user 225 may control an account on the ledger 205. To initiate a payment, a user may need to select and register with a connector so that the connector can issue the appropriate instructions to a ledger to transfer resources out of a user's account. For example, the user 221 may register with one or both of the connector 213 and the connector 210 in order to initiate payment in the electronic payment network using the account on the ledger 200 controlled by the user 221. A user may be, for example, a person, group, organization, or computer hardware and software, using any suitable computing device or system to communicate with ledgers and connectors in the electronic payment network. For example, a user may be a person using a computing device such as a laptop to initiate a payment in the electronic payment network. The user's computing device may use any suitable wired or wireless connection to communicate with connector and ledgers. The connection may be a network connection, such as a WAN or LAN connection, or may be internal bus connection, for example, within a computing system.

Figure 2B:
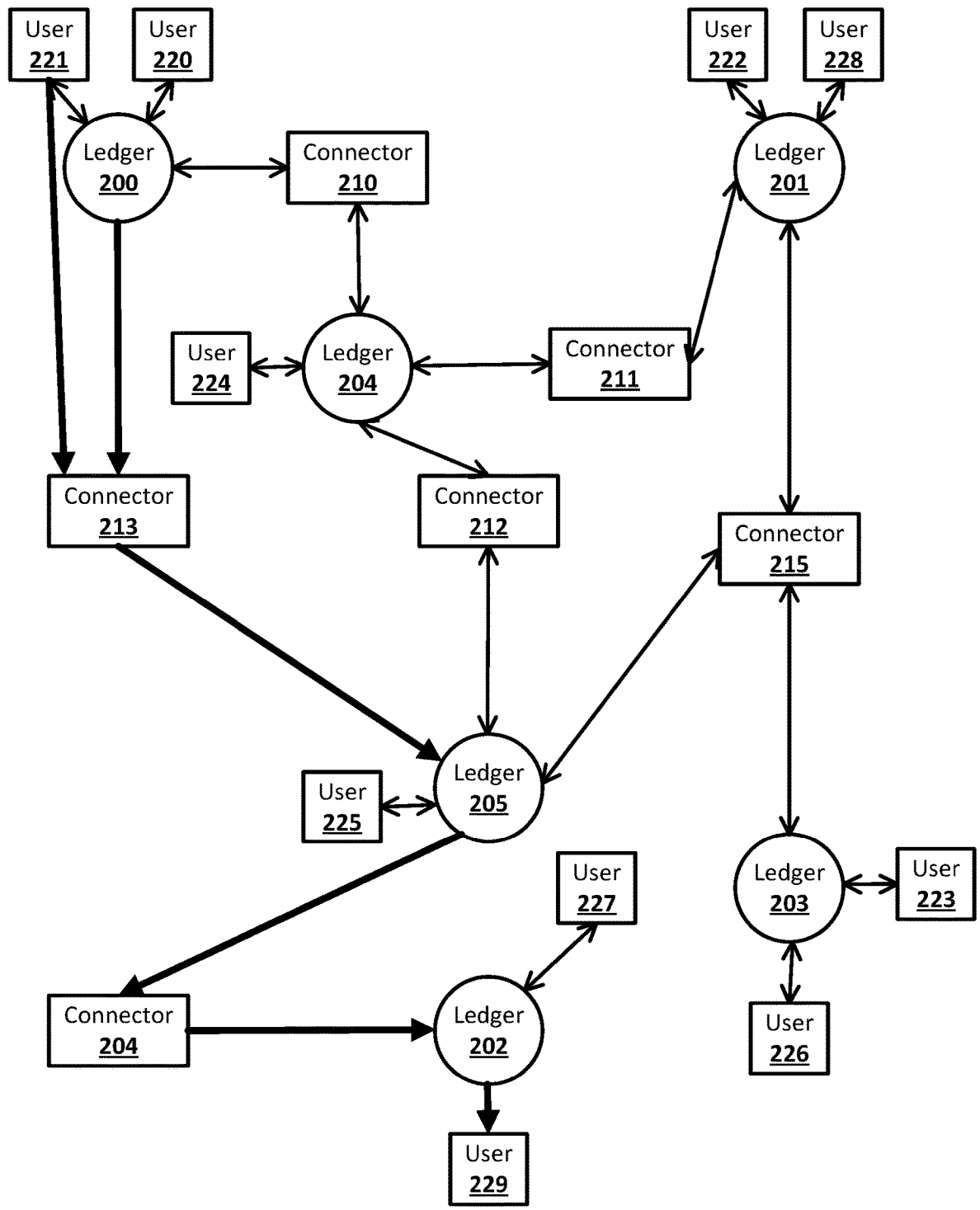
FIG. 2B shows an example system suitable for electronic payment network security according to an implementation of the disclosed subject matter.

FIG. 2B shows an example system suitable for electronic payment network security according to an implementation of the disclosed subject matter. A user may initiate a payment which may be routed through the electronic payment network. For example, the user 221 may wish to make a payment to the user 229. The payment may need to be delivered into an account controlled by the user 229 on the ledger 202. The user 221 may register with the connector 213, and may issue an instruction to the connector 213 to initiate payment to the user 229. The route for the payment may be determined any suitable manner, using any suitable pathfinding algorithm. For example, the connector 213 may communicate with other connectors in the electronic payment network to determine which connectors may be able to make payment to the user 229 on the ledger 202. The route may then be determined based on which other connectors and ledgers may need to be involved for the payment to reach the connector that can make the final payment. The route may be determined in a centralized manner, for example, by the connector 213 or other centralized system, or may be determined in a decentralized manner, for example, with each connector added to the route determining the next connector in the route. The pathfinding algorithm may also account for other suitable criteria, such as, for example, exchange rates used by various connectors when a payment will involve different resource, for example, as in cross-currency payments, and fees that may be charged by the various connectors. The pathfinding algorithm may also incorporate any available data about the trustworthiness of the various connectors. The ledgers and connectors may communicate in any suitable manner to set up the route for the payment, and may, for example, use a common communications protocol.

The route for the payment initiated by the user 221 may include the ledger 200, the connector 213, the ledger 205, the connector 204, and the ledger 202. The route may have two segments. The first segment may be from the ledger 200 to the ledger 205 through the connector 213, and the second segment may be from the ledger 205 to the ledger 202 through the connector 204. The payment may be made in any suitable manner. For example, the connector 213 may cause the ledger 200 to transfer a specified amount of resources from an account controlled by the user 221 to an account controlled by the connector 213 on the ledger 200. The connector 204 may cause the ledger 205 to transfer a specified amount of resources from an account controlled by the connector 213 to an account controlled by the connector 204 on the ledger 205. The connector 204 may also cause the ledger 202 to transfer a specified amount of resources from an account controlled by the connector 204 to an account controlled by the user 229 on the ledger 202, completing the payment. The user 229 may be notified of the payment in any suitable manner, such as, for example, electronic communication from any of the user 221, the connector 213, the connector 204, and the ledger 202. The user 229 may be able to access the payment in the account controlled by the user 229 on the ledger 202. The transfers may occur in any suitable order. For example, all of the transfers may occur at the same time, may occur in order from the ledger of the payor, the ledger 200, to the ledger of the payee, the ledger 202, or may occur in reverse order from the ledger 202 to the ledger 200. Any suitable communication may occur among the connectors 213 and 204 and the ledgers 200, 205, and 202, to ensure that transfers on each ledger are properly authorized and occur when proper conditions are met, and that appropriate amounts of the appropriate resources are transferred on the ledgers.

The completion of the payment from the user 221 to the user 229 may be detected by, or reported to, for example, the network monitor 110 of the security computing device 100, which may monitor the electronic payment network. Payment data describing the payment may be stored as a payment record with the payment records 149 in the payment records database 142 with an origin of the user 221 and a destination of the user 229, and any other suitable available data about the payment and the users 221 and 229. None, some, or all of the route may be included in the payment record. The payment data may be evaluated for fraud by the convolutional neural network 130, or may be evaluated for fraud according to any other criteria to generate a payment record and label that may be used to train the convolutional neural network 130.

Figure 2C:
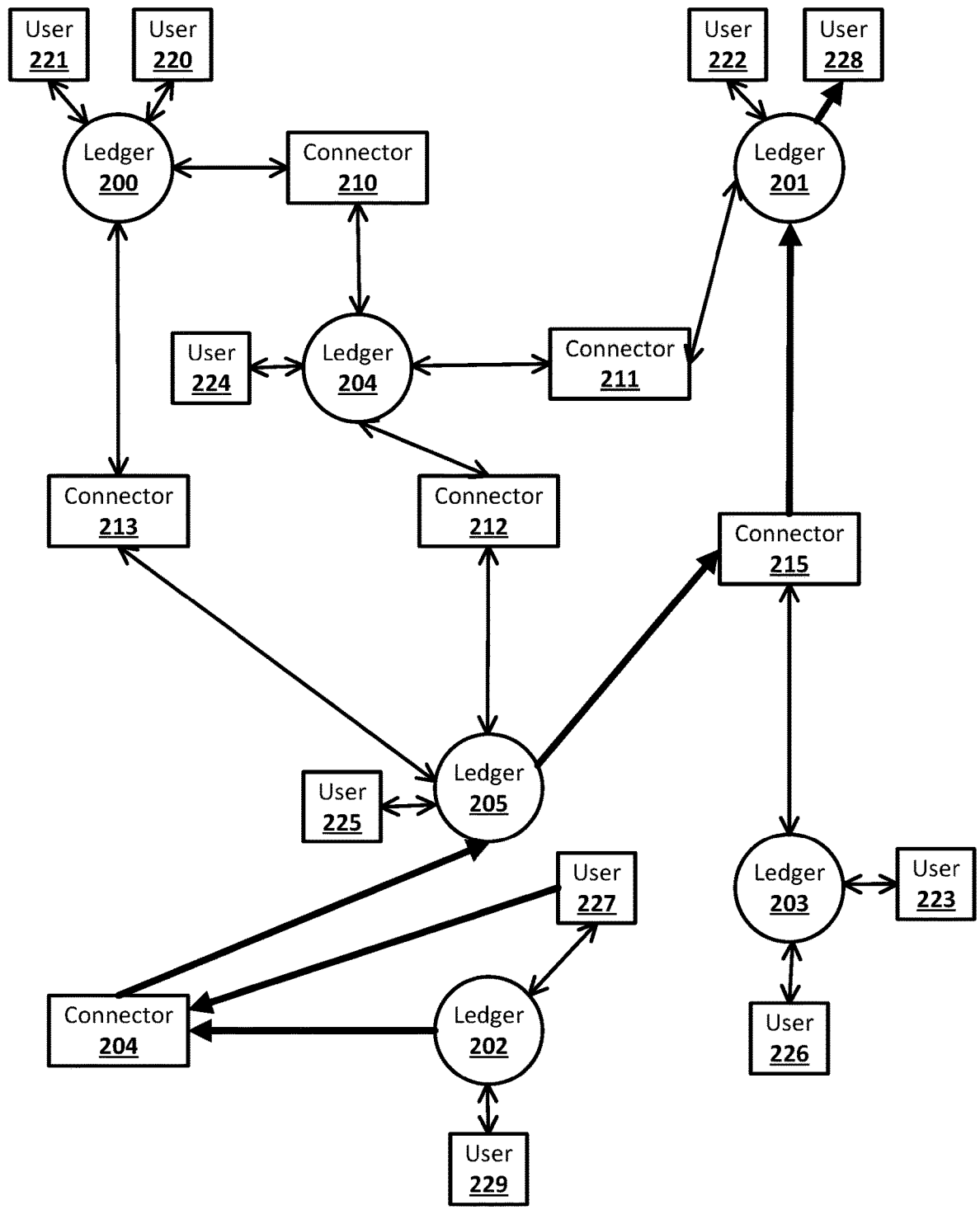
FIG. 2C shows an example system suitable for electronic payment network security according to an implementation of the disclosed subject matter.

FIG. 2C shows an example system suitable for electronic payment network security according to an implementation of the disclosed subject matter. The user 227 may initiate a payment to the user 228. The user 227 may control an account on the ledger 202, and may be registered at the connector 204. The route for the payment may have two segments. The first segment may be from the ledger 202 to the ledger 205 through the connector 204. The second segment may be from the ledger 205 to the ledger 201 through the connector 215. The payment may be delivered to the user 228 on the ledger 201 through a transfer from an account controlled by the connector 215. The user 228 may be notified of the payment in any suitable manner, such as, for example, electronic communication from any of the user 227, the connector 204, the connector 215, and the ledger 201. The user 229 may be able to access the payment in the account controlled by the user 229 on the ledger 202. The completion of the payment from the user 229 to the user 228 may be detected by, or reported to, for example, the network monitor 110 of the security computing device 100, which may monitor the electronic payment network. Payment data describing the payment may be stored as a payment record the payment records 149 in the payment records database 142 with an origin of the user 229 and a destination of the user 228 and any other suitable available data about the payment and the users 228 and 229. None, some, or all of the route may be included in the payment record. The payment data may be evaluated for fraud by the convolutional neural network 130, or may be evaluated for fraud according to any other criteria to generate a payment record and label that may be used to train the convolutional neural network 130.

Figure 2D:
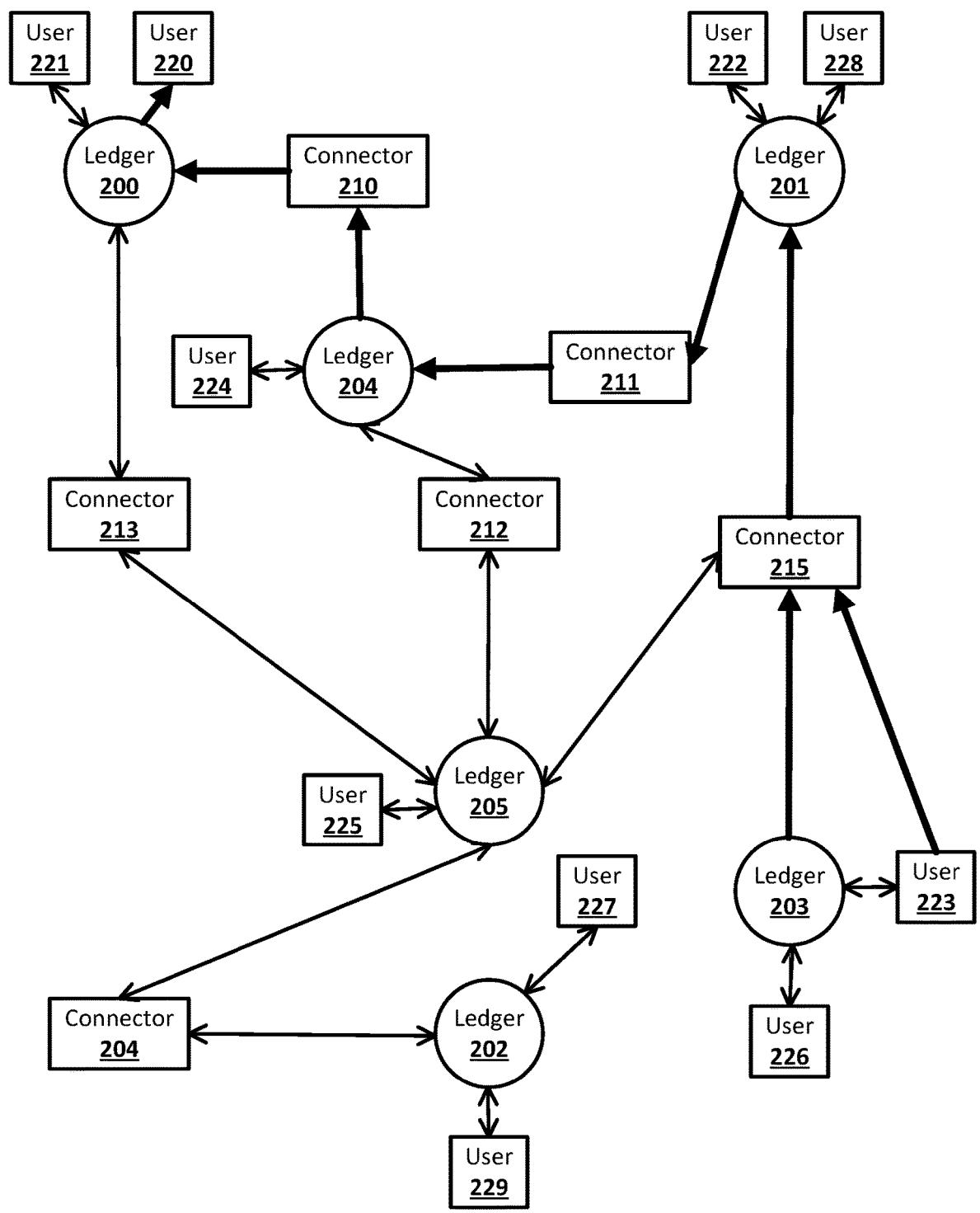
FIG. 2D shows an example system suitable for electronic payment network security according to an implementation of the disclosed subject matter.

FIG. 2D shows an example system suitable for electronic payment network security according to an implementation of the disclosed subject matter. The user 223 may initiate a payment to the user 220. The user 223 may control an account on the ledger 203, and may be registered at the connector 215. The route for the payment may have three segments. The first segment may be from the ledger 203 to the ledger 201 through the connector 215. The second segment may be from the ledger 201 to the ledger 204 through the connector 211. The third segment may be from the ledger 204 to the ledger 200 through the connector 210. The payment may be delivered to the user 220 on the ledger 200 through a transfer from an account controlled by the connector 210. The user 220 may be notified of the payment in any suitable manner, such as, for example, electronic communication from any of the user 223, the connector 215, the connector 211, the connector 201, and the ledger 200. The user 220 may be able to access the payment in the account controlled by the user 220 on the ledger 200. The completion of the payment from the user 223 to the user 220 may be detected by, or reported to, for example, the network monitor 110 of the security computing device 100, which may monitor the electronic payment network. Payment data describing the payment may be stored as a payment record with the payment records 149 in the payment records database 142 with an origin of the user 223 and a destination of the user 220, and any other suitable available data about the payment and the users 220 and 223. None, some, or all of the route may be included in the payment record. The payment data may be evaluated for fraud by the convolutional neural network 130, or may be evaluated for fraud according to any other criteria to generate a payment record and label that may be used to train the convolutional neural network 130.

Figure 3:
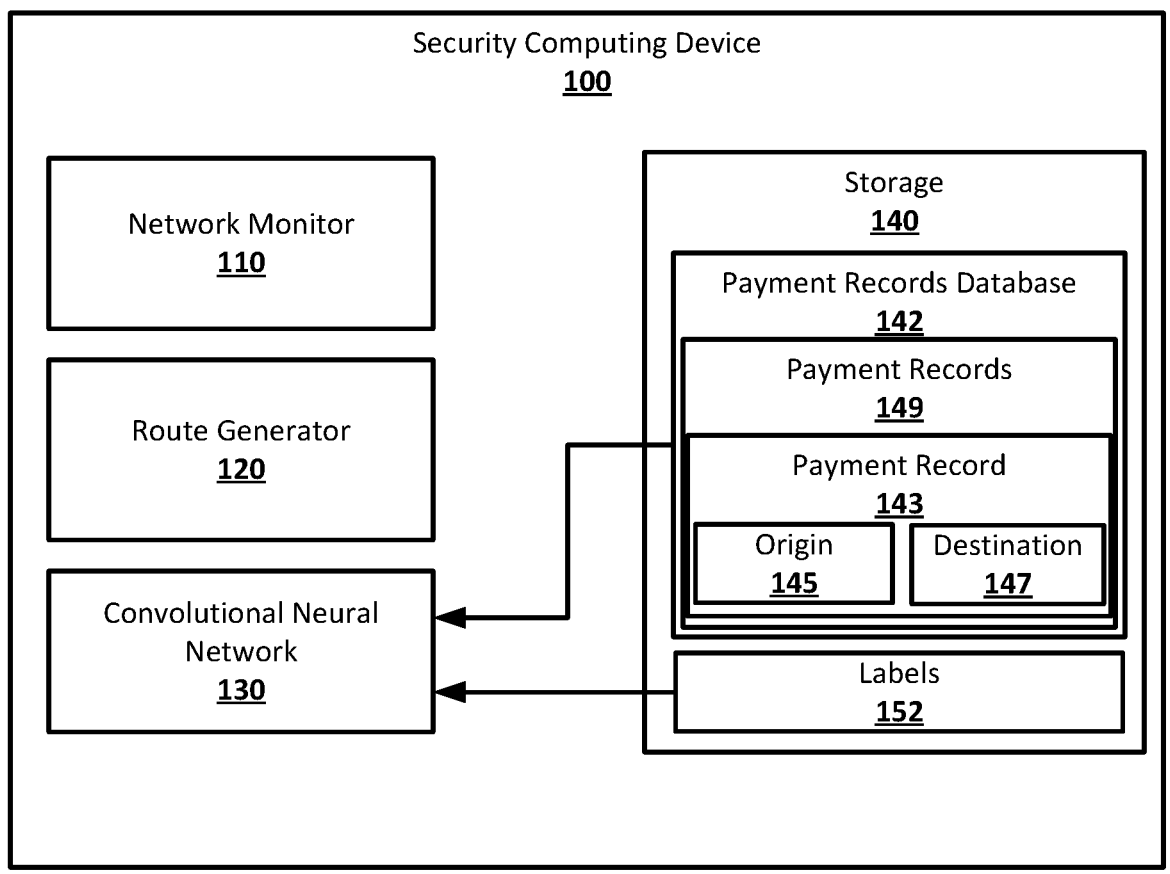
FIG. 3 shows an example system suitable for electronic payment network security according to an implementation of the disclosed subject matter.

FIG. 3 shows an example system suitable for electronic payment network security according to an implementation of the disclosed subject matter. The convolutional neural network 130 may be trained using the payment records 149 which have associated labels in the labels 152. For example, some of the payment records 149 for payments that have already taken place in the electronic payment network may be evaluated for fraud according to basic fraud checking criteria, for example, based on known data about the payor or payee in the payment, such as name, address, and credit history. A connector in the electronic payment network may also report fraudulent payments when the connector determines that it has been used in fraudulent payment, for example, by a malicious actor that has registered to use the connector. Each evaluated payment record from the payment records 149 may be assigned a label that may be stored in the labels 152. The label for a payment record may indicate the fraud probabilities for the payment described by the payment record. A label may indicate fraud in any suitable manner. For example, a label may be binary, indicating that a payment either is or isn't fraudulent or a probability, indicating that probability that a payment is fraudulent. Binary indicators or probabilities may also be assigned to each party, for example, user, connector, and ledger, within a payment. The payment record may not include the full route of the payment. Fraud probabilities in the label may only be assigned to parties known to have participated in the payment route, or may also be assigned to the parties that are part of the estimated route, as generated by the route generator 120, even if they were not part of the non-estimated part of the route.

The payment records 149 with associated labels in the labels 152 may be used to train the convolutional neural network 130. A payment record, such as, for example, the payment record 143, from the payment records 149 that has an associated label in the labels 152 may be received from the payment records database 142 in the storage 140 at an input layer of the convolutional neural network 130. The payment record be input based on the segments of the route, or estimated route, for the payment in the payment record. For example, each segment may be represented as a vector of integers, with the integers representing unique identifiers for the connector and ledgers involved in the segment of the payment. Integers representing a ledger or connector may be consistent across all payment records that include the ledger or connector, and may function as an identifier for the ledger or connector within the electronic payment network. The vector for a segment may also include representations for other aspects of the payment, including, for example, identifiers for the payor and payee, amount and type of resources involved in the segment, and any other data available in the payment record. Other data from the payment record, such as the identities of the payor and payee for the payment, and the total amount of the payment, may be represented in each of the segment vectors, in separate segment vectors, for example, with the payor represented in the first segment vector and the payee represented in the last segment vector, or may be represented in a separate vector from the segment vectors. For a payment record with more than one segment, a vector representing one of the segments may be applied to the input layer of an encoder neural network of the neural network, and then the vector representing the next segment may be applied to the input of the encoder neural network while the hidden layer of the encoder neural network is also applied due to the recurrent nature of the encoder neural network, until all segments have been applied to the input of the encoder neural network. This may result in the hidden layer of the encoder neural network being an encoded vector representation of all the segments of the route for the payment record, as well as any other data from the payment record input to the encoder neural network. The segments may be applied to the input of the encoder neural network in any suitable order. For example, the segments may be applied in order from payor to payee, or from payee to payor.

After all the segments of the route for the payment in the payment record, for example, the payment record 143, have been applied to the encoder neural network, the hidden layer of the encoder neural network may be applied to the input layer of the decoder neural network of the convolution neural network 130. The decoder neural network may output a single value, which may be, for example, a probability that, or binary indicator of whether, the payment in the payment record 143 involves fraud. The decoder neural network may also output multiple values, for example, one value for each party to the payment that indicates the probability that, or is a binary indicator of whether, the party is responsible for fraud in the payment. The multiple values may be output at once, or may be output in sequence based on recurrence in the decoder neural network. For example, the decoder neural network may recur with the hidden layer of the decoder neural network being input back into the decoder neural network along with the hidden layer of the encoder neural network and the previous output of the decoder neural network. The decoder neural network may also output a value which may indicate the type of fraud that may be present in the payment.

The fraud probabilities output by the convolutional neural network 130 for a payment record, such as the payment record 143, may be compared to the fraud probabilities in the label from the labels 152 for the payment record to determine a level of error for the convolutional neural network 130. The level of error may be used to train the convolutional neural network 130. For example, adjustments to the weights of the various layers of the convolutional neural network 130 may be determined and applied to the convolutional neural network 130, adjusting the weights of the convolutional neural network 130. The level of error and weight adjustments may be determined in any suitable manner, such as, for example, by using backpropagation. If the labels for the payment records include an indication of the type of fraud that may be present in the payment, the level of error may also incorporate any errors in the output of the convolutional neural network 130 indicating the type of fraud. The convolutional neural network 130 may be trained using any suitable number of the payment records 149, which may be input to the convolutional neural network 130 any suitable number of times. For example, the convolutional neural network 130 may be trained using the payment records until it has achieved some target level of error in the output probabilities of fraud for the payment records being used to train the convolutional neural network 130. Some percentage of payment records 149 with associated labels in the labels 152 may be used to test the convolutional neural network 130 to determine if it has achieved a desired level of error, and may not be used to determine weight adjustments for the convolutional neural network 130, for example, to help avoid overfitting of the convolutional neural network 130.

Figure 4:
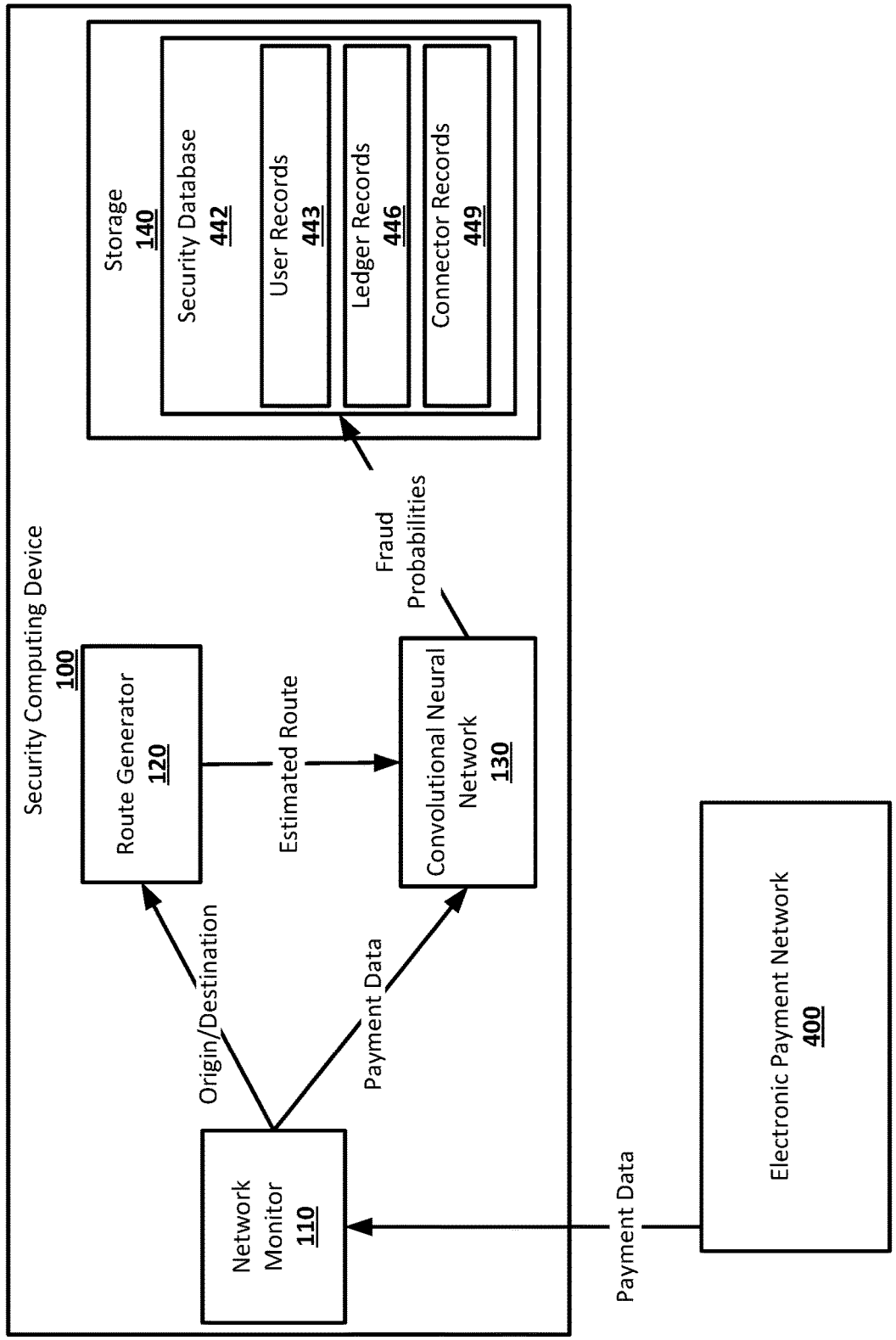
FIG. 4 shows an example system suitable for electronic payment network security according to an implementation of the disclosed subject matter.

FIG. 4 shows an example system suitable for electronic payment network security according to an implementation of the disclosed subject matter. The security computing device 100 may be used to monitor payments in an electronic payment network 400. The electronic payment network 400 may be, for example, an electronic payment network including the ledgers 200, 201, 202, 203, 204, and 205, the connectors 210, 211, 212, 213, 214, and 215, and the users 220, 221, 222, 223, 224, 225, 226, 227, 228, and 229. The security computing device 100 may be, for example, associated with one of the ledgers 200, 201, 202, 203, 204, and 205. For example, the security computing device 100 may be part of the same server system as one of the ledgers 200, 201, 202, 203, 204, and 205. The security system 100 may also be independent of any of the computing devices and systems in the electronic payment network 400, and may be connected to the electronic payment network 400 through any suitable form of wired or wireless communications using any suitable protocols.

The network monitor 110 may receive payment data from the electronic payment network 400. The payment data may be sent to the network monitor 110 on the security computing device 100, for example, by a connector or ledger involved in a payment, or may be gathered by the network monitor 110 based on, for example, monitoring activity and communications in the electronic payment network 400. The payment data received by the network monitor 110 may include any suitable data associated with the payment, such as, for example, data about the origin and destination of the payment, including identification of a payor and payee, ledgers and connectors involved in the payment, any available segments of the route used by the payment, amount of the payment, and any other data that may be used as part of a payment record, such as the payment record 143.

The network monitor 110 may send origin and destination data from the payment data to the route generator 120. The origin and destination data may, for example, identify the user 223 as the origin, or payor, and the user 220 as the destination, or payee, for the payment. The route generator 120 may use the origin and destination to estimate the route of the payment. The estimated route may be an estimate of the entire route, or may be an estimate of unknown segments of the route if some of the route segments, or portions thereof, were included in the payment data that was received at the network monitor 110. The estimated route may be a best estimate of the route the payment took based on the payment data, any available data about the topology of the electronic payment network 400, and any available data about the pathfinding algorithm used to route payments through the electronic payment network 400. Because the security computing device 100 and route generator 120 may not may have a complete view of the topology of the electronic payment network 400 due to the user-generated nature of the electronic payment network 400, the estimated route for a payment may differ from the route the payment actually took. The route generator 120 may not be used when the payment data already includes a complete route for the payment.

The convolutional neural network 130 may receive the payment data for the payment from the network monitor 110 and the estimated route for the payment from the route generator 120 if the payment data does not include a complete route for the payment. The convolutional neural network 130 may output fraud probabilities for the payment. The payment data may be supplemented with data related to the payment that may not be directly available from the payment data as received from the electronic payment network 400. For example, additional information about parties involved in the payment, such as the payor and payee, may be retrieved based on the identity of the parties as indicated in the payment data. The payment data and estimated route may be represented in any suitable format for input into the convolutional neural network 130, such as, for example, as multiple vectors. For example, a different vector may represent each segment of the estimated route of a payment from the user 223 to the user 220, including the first segment from the ledger 203 to the ledger 201 through the connector 215, the second segment from the ledger 201 to the ledger 204 through the connector 211, and the third segment from the ledger 204 to the ledger 200 through the connector 210. Each vector representation of a segment may include the amount and type of resource transferred in that segment. Other payment data, such as the origin and destination and total payment amount, may be represented in each of the segment vectors, may be represented in separate segment vectors, or may be represented by their own separate vector.

The output from the convolutional neural network 130 may be a single value, which may be, for example, a probability the payment involves fraud based on the payment data and the estimated route. The convolutional neural network 130 may also output multiple values, for example, one value for each party to the payment that indicates the probability that, or is a binary indicator of whether, the party is responsible for fraud in the payment. For example, the convolutional neural network 130 may output a fraud probability for each of the user 223, the user 220, the ledger 203, the ledger 201, the ledger 204, the ledger 200, the connector 215, the connector 215, the connector 211, and the connector 210 based on input of the payment data and estimated route for the payment from the user 223 to the user 220. The multiple values may be output at once, or may be output in sequence. The convolutional neural network 130 may also output an indication of the type of fraud that may be present in the payment.

The fraud probabilities output by the convolutional neural network 130 may be stored in a security database 142, which may be stored in the storage 140. The security database 442 may store any suitable data pertaining to the security of the electronic payment network 400. For example, the security database 442 may include user records 443, which may be security records for users who are, or were previously, registered with a connector of the electronic payment network 400, ledger records 446, which may be security records for the ledgers that are, or were previously, connected to by connectors of the electronic payment network 400, and connector records 449, which may be security records for connectors that are, or were previously, part of the electronic payment network 400. Fraud probabilities for a user, ledger, or connector, may be stored in the appropriate record for the user, ledger, or connector, with the user records 443, the ledger records 446, or the connector records 449 of the security database 442. Users may be identified in the user records 443, for example, based on any of identification provided voluntarily by the connectors of the electronic payment network 400, or by a fingerprint based on data collected from a user's computing device when the user initiates a payment, such as, for example, the web browser used by a user to initiate the payment, plug-ins installed on the web browser, data entered into form fields in the web browser by the user to initiate the payment, the operating system in which the web browser is running, and any other possible identifying information for a user that may be gathered when the user initiates a payment. For example, the user 223 may be identified in the user records 443 based on identification provided by the connector 215 using data provided to the connector 215 by the user 223 during registration with the connector 215, or by fingerprint data gathered, for example, when the user 223 initiates payment to the user 220 with the connector 215. Connectors, such as the connector 215, may voluntarily register with the security computing device 100, or may be probed by the security computing device 100 in any suitable manner. Ledgers, such as the ledger 203, may voluntarily register with the security computing device 100, or may be probed by the security computing device 100 in any suitable manner.

The fraud probabilities output by the convolutional neural network 130 to the security database 442 may be used to generate or update risk scores for any of the users in the user records 443, the ledgers in the ledger records 446, and connectors in the connector records 449 that were involved in the payment according to the payment data and estimated route. For example, if the convolutional neural network 130 outputs a single value that indicates a high probability of fraud in the payment from the user 223 to the user 220, the risk scores in the security database 442 for the user 223, the user 220, the ledger 203, the ledger 201, the ledger 204, the ledger 200, the connector 215, the connector 215, the connector 211, and the connector 210 may all be updated, for example, increased, based on the high probability of fraud in the payment. If the convolutional neural network 130 outputs multiple values indicating the probability of fraud by each party in the payment from the user 223 to the user 220, the risk scores for the user 223, the user 220, the ledger 203, the ledger 201, the ledger 204, the ledger 200, the connector 215, the connector 215, the connector 211, and the connector 210 may be updated based on the probability of fraud assigned to each party. A value indicating a high probability of fraud by the user 223 may result in an increased risk score for the user 223 but may not affect the risk score for the user 220.

The risk scores in the security database 442 may also be changed based on, for example, which connectors a user registers with and which ledgers a user has accounts on or has payments routed through, and the number of connectors a user has registered with and the period of time over which the user registered with the connectors. For example, if the connector 211 has a high risk score, the risk score for the user 223 may increase if the user 223 registers with the connector 211. If the ledger 201 has a high risk score, the risk score for the user 223 may increase if the user 223 starts an account on the ledger 201 or makes a number of payments that are routed through the ledger 201. The risk score for the user 223 may also increase if the user 223 is seen to have registered with a large number of connectors in a short time period, for example, registering with the connector 211, the connector 212, the connector 204, the connector 210, and the connector 213 on the same day.

The data in the user records 443, the ledger records 446, and the connector records 449 may be made available to any suitable party. For example, the user 223 may attempt to register with the connector 211, for example, after opening an account on the ledger 201. The connector 211 may check the user records 443 for any data on the user 223 based on, for example, registration data provided to the connector 211 by the user 223, or based on a fingerprint from the computing device of the user 223. The connector 211 may deny registration to the user 223 if the risk score for the user 223 in the user records 443 is higher than a threshold set by the connector 211. Every connector may determine the maximum risk score a user may have and still be allowed to register at the connector, and a connector may change this maximum risk score at any time. A connector may also avoid connecting to a ledger with a high risk score. For example, the connector 215 may not connect to the ledger 202 due to the ledger 202 having a risk score above a maximum threshold, for example, by not opening an account on the ledger 202. Ledgers may also avoid being connected to by a connector with a high risk score, for example, by refusing to allow a connector with a high risk score to open an account or closing an already open account. For example, the ledger 202 may refuse to allow for an account controlled by the connector 215 to be opened on the ledger 202 if the connector 215 has too high a risk score.

The fraud probabilities output by the convolutional neural network 130 may result in other actions being taken, for example, by the security computing device 100. For example, the fraud probabilities may indicate a high probability that the account on the ledger 203 controlled by the user 223 has been taken over from its original owner by a malicious actor, the user 223, who acted as the payor in the payment. The user 223 may have registered at the connector 215, and used the connector 215 to initiate the payment from the taken over account the user 223 now controls on the ledger 203. The original owner of the account on the ledger 203 may be notified by the security computing device 100, for example, through any suitable form of electronic communication, and may be assisted in regaining control of their account on the ledger 203, or in setting up a new account on the ledger 203 while the compromised account on the ledger 203 is closed. Suitable action may also be taken regarding the malicious actor, the user 223, and the connector 215 used to initiate the payment from the taken over account on the ledger 203.

The fraud probabilities may indicate a high probability the account on the connector 215 used to initiate the payment has been taken over from its original owner by a malicious actor, the user 223, and used to initiate payment from an account on the ledger 203 that belonged to the original owner of the connector account. The malicious actor, the user 223, may have compromised the account on the connector 215 and used the connector 215 to initiate the payment from the original owner's account on the ledger 203, as the account on the connector 215 may be authorized to make payment from the original owner's account on the ledger 203. The original owner of the account on the connector 215 may be notified, for example, through any suitable form of electronic communication, and may be assisted in regaining control of their account on the connector 215 or in setting up a new account on the connector 215 while the compromised account on the connector 215 is closed. Suitable action may also be taken regarding the malicious actor, the user 223.

The fraud probabilities may indicate a high probability that the payor, for example, the user 223, initiated a fraudulent payment from their own account on the connector 215 and account on the ledger 203 and that neither account has been compromised by another party. The accounts on the ledger 203 and the connector 215 belonging to the user 223 may be closed automatically, for example, based on communication between the security computing device 100 and the connector 215 and the ledger 203. Other actions taken by the security computing device 100 may include, for example, sending communications to a connector to refund a payment to the payor when the payee has committed fraud and sending communications to a payee to not honor a fraudulent payment committed by a payor. The security computing device 100 may also send communications to ledgers and connectors when necessary, for example, to warn them of fraud detected in payments in which they were part of the route the payment took through the electronic payment network 400.

The security computing device 100 may use the convolutional neural network 130 to evaluate any number of payments in the electronic payment network 400 for fraud. For example, every payment for which payment data is received by the network monitor 110 may be evaluated for fraud using the convolutional neural network 130, or only selected payments may be evaluated. There may be multiple security computing devices similar to the security computing device 100 monitoring the same electronic payment network, for example, the electronic payment network 400, or monitoring multiple, separate, electronic payment networks. A security computing device, such as the security computing device 100, may include multiple instances of the convolutional neural network 130, for example, to allow simultaneous evaluation of payment data for multiple payments based on parallelism allowed by various central processing units (CPUs), graphical processing units (GPUs), and tensor processing units (TPUs), that may be components of the security computing device 100.

Figure 5:
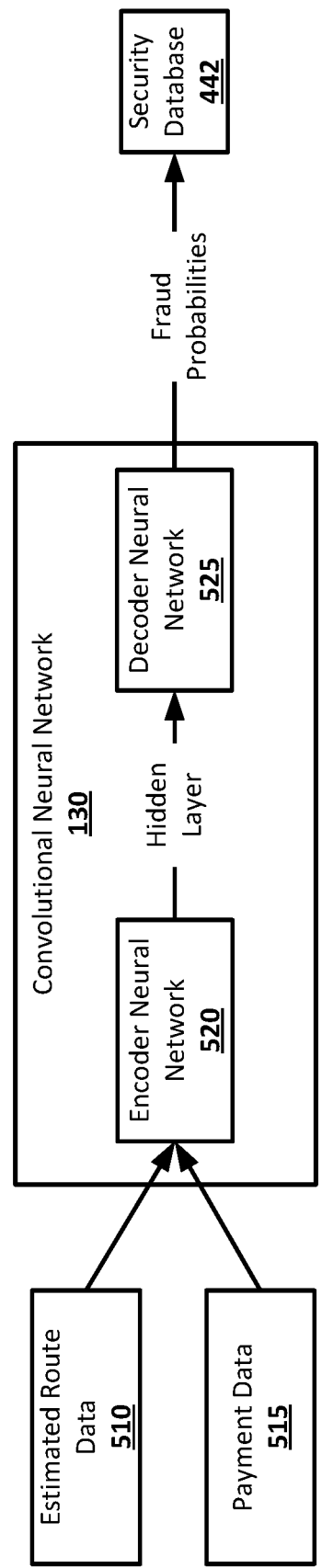
FIG. 5 shows an example system suitable for electronic payment network security according to an implementation of the disclosed subject matter.

FIG. 5 shows an example system suitable for electronic payment network security according to an implementation of the disclosed subject matter. Payment records and payment data may be input to the convolutional neural network 130 in any suitable format. For example, the payment data 515, which may be payment data for a payment received at the network monitor 110, may be input based on the segments of the route, or estimated route 510, taken by the payment in the electronic payment network 400. The estimate route 510 may be an estimated route generated by the route generator 120 based on the payment data 515, which may not include a complete route for the payment. For example, the payment data 515 may include data for the payment from the user 223 to the user 220, which may have an estimated route 510 that includes three segments. The first segment may be from the ledger 203 to the ledger 201 through the connector 215. The second segment may be from the ledger 201 to the ledger 204 through the connector 211. The third segment may be from the ledger 204 to the ledger 200 through the connector 210. Each segment may be represented as a vector of integers, with the integers representing unique identifiers for the connector and ledgers involved in the segment of the payment, and may also represent other aspects of the payment data 515. Each vector may be input in sequence to an encoder neural network 520 of the convolutional neural network 130. The encoder neural network 520 may be, for example, a recurrent neural network which may use a long short-term memory structure. The recurrence of the encoder neural network 520 may result may result in the hidden layer of the encoder neural network being a vector representation of the three segments of the payment from the estimated route 510 and other data from the payment data 515 input either as part of the vector representations of the segments or as a separate vector representation input to the encoder neural network 520.

After all the segments from the estimated route 510 have been applied to the encoder neural network 520, the hidden layer of the encoder neural network 520 may be applied to the input layer of a decoder neural network 525 of the convolutional neural network 130. The decoder neural network 525 may output fraud probabilities, for example, as single value or multiple values output simultaneously, for example, as an output vector, or in sequence. For example, the decoder neural network 525 may recur with the hidden layer of the decoder neural network 525 being input back into the decoder neural network 525 along with the hidden layer of the encoder neural network 520 and the previous output of the decoder neural network 525, until the decoder neural network 525 outputs a stop signal indicating the end of the output. This may allow the decoder neural network 525 to output multiple values, for example, fraud probabilities, in sequence. The fraud probabilities may be output to the security database 442, which may store the fraud probabilities and update the user records 443, the ledger records 446, and the connector records 449 as necessary.

Figure 6:
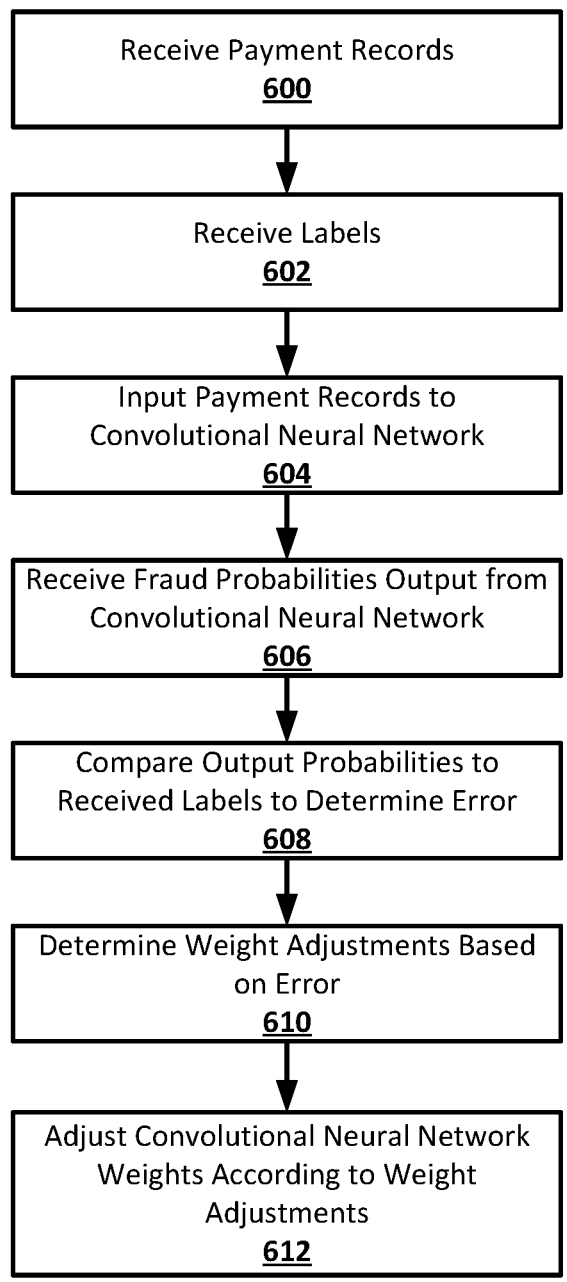
FIG. 6 shows an example procedure suitable for electronic payment network security according to an implementation of the disclosed subject matter.

FIG. 6 shows an example procedure suitable for electronic payment network security according to an implementation of the disclosed subject matter. At 600, a payment record may be received. For example, the payment record 143, or a payment record from the payment records 149 from the payment records database 142, may be received at the security computing device 100. The payment record may include data describing a payment that occurred in the electronic payment network 400. The payment record may include a complete payment route for the payment described in the payment record. The route may be complete based on data available when the payment was made, or may be completed using the route generator 120 to estimate the route.

At 602, a label may be received. For example, a label for the payment record received by the security computing device 100 may be received at the security computing device 100. The label may be stored with the labels 152 and may indicate fraud probabilities for the payment described by the payment record received at the convolutional neural network 130. The label for a payment record may include fraud probabilities indicated by values that are binary indicators or probabilities. A label may include multiple binary indicators or probabilities for the same payment record, for example, including one value for each user, connector, and ledger in the payment described in the payment record. The label may be generated based on evaluation of the payment record for fraud using basic fraud checking criteria, for example, based on known data about the payor or payee in the payment, such as name, address, and credit history.

At 604, a payment record may be input to convolutional neural network. For example, vectors representing the segments of the route of the payment described in the payment record received by the security computing device 100, and other data from the payment record, may be applied to an input layer of the convolutional neural network 130. The convolutional neural network 130 may include the encoder neural network 520, and the vectors representing the segments of the route may be applied to the encoder neural network 520 in sequence so that the hidden layer of the encoder neural network 520 may be an encoded representation of all the segments of the route through recurrence.

At 606, fraud probabilities may be received from the convolutional neural network. For example, the convolutional neural network 130 may output fraud probabilities for the payment described in the payment record input to the convolutional neural network 130. The hidden layer of the encoder neural network 520 may be applied as input to the input layer of the decoder neural network 525. The decoder neural network 525 may output fraud probabilities, which may be a single value or multiple values, and may be binary value or probabilities. The fraud probabilities may indicate the probability that the payment described by the input payment record is fraudulent, and may also indicate the probability that any party in the payment route is responsible for fraud, and the type of fraud that may be present in the payment.

At 608, the fraud probabilities may be compared to the received label to determine a level of error. For example, fraud probabilities output by the convolutional neural network 130 may be compared to the fraud probabilities in the label for the payment record that was input into the convolutional neural network 130. The level of error may be based on any differences between the fraud probabilities output by the convolutional neural network 130 and the indications of fraud in the label, including differences in the type of fraud.

At 610, weight adjustments may be determined for the convolutional neural network based on the level of error. For example, backpropagation, or any other suitable neural network training technique, may be used to determine weight adjustments for the convolutional neural network 130 based on the level of error in fraud probabilities output by the convolutional neural network 130.

At 612, weight adjustments may be applied to the convolutional neural network. For example, the weights of the neural network 130 may be adjusted based on the weight adjustments determined based on the level of error in the fraud probabilities output by the convolutional neural network 130.

Figure 7:
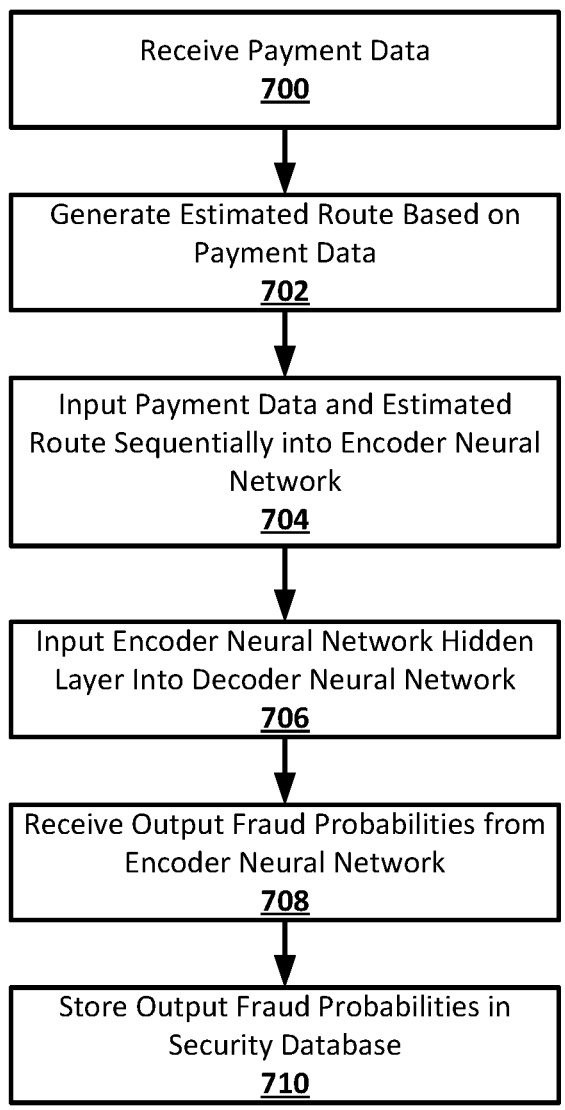
FIG. 7 shows an example procedure suitable for electronic payment network security according to an implementation of the disclosed subject matter.

FIG. 7 shows an example procedure suitable for electronic payment network security according to an implementation of the disclosed subject matter. At 700, payment data may be received. For example, payment data for a payment that has occurred in the electronic payment network 400 may be received by the network monitor 110 of the security computing device 100. The payment may be, for example, the payment from the user 223 to the user 220. The payment data may be received based on active monitoring of communications and activity within the electronic payment network 400 by the network monitor 110, or passive monitoring, for example, through reports sent to the network monitor 110 by systems within the electronic payment network 400.

At 702, an estimated route for the payment data may be generated. For example, when the payment data received at the network monitor 110 does not include a complete route of the payment through the electronic payment network 400, the route generator 120 may generate an estimated route for the payment. The estimated route may be based on any data regarding the topology of the electronic payment network 400 and any data about the pathfinding algorithm used to route payments through the electronic payment 400 network available to the route generator 120. Because the security computing device 100 may not may have a complete view of the topology of the electronic payment network 400 due to the user-generated nature of the electronic payment network 400, the route estimated based on the payment data may differ from the route the payment actually took.

At 704, the payment data and estimated route may be input to an encoder neural network. For example, the convolutional neural network 130 may include the encoder neural network 520. The estimated route for the payment, and other data from the payment data, may be represented as vectors and input to the encoder neural network 520. For example, each segment of the estimated route may be represented by a vector, and the vectors for each segment may be input sequentially to an input layer of the encoder neural network 520, which may be a recurrent neural network.

At 706, the hidden layer of the encoder neural network may be input to a decoder neural network. For example, the convolutional neural network 130 may include decoder neural network 525. The hidden layer of the encoder neural network 520, which may be an encoded representation of the segments of the estimated route of the payment and other data from the payment data, may be input to an input layer of the decoder neural network 525. The hidden layer may be represented as, for example, a vector.

At 708, fraud probabilities may be received from the decoder neural network. For example, the decoder neural network 525 of the convolutional neural network 130 may output fraud probabilities for the payment described in the payment data input to the convolutional neural network 130 at the layer of the encoder neural network 525. The fraud probabilities may be a single value or multiple values, and may be binary value or probabilities. Multiple fraud probabilities may be output in sequence based on a recurrence of the decoder neural network 525. The fraud probabilities may indicate the probability that the payment described by the input payment data is fraudulent, and may also indicate the probability that any party in the estimated route for the payment is responsible for fraud, and the type of fraud that may be present in the payment.

At 710, the fraud probabilities may be stored in the security database. For example, the fraud probabilities may be stored in the security database 442. The fraud probabilities may be associated with the payment data, which may be stored, for example, in the payment records database 142. The fraud probabilities may be used to generate or change risk scores in the user records 443, the ledger records 446, and the connector records 449 for any of the users, ledgers, and connectors in the payment. The fraud probabilities may also be used by the security computing device 100 to take additional action. For example, the security computing device 100 may send electronic communications to a user that may have had their account on a ledger or connector taken over by a malicious actor, may cause a ledger to closed the account of a user or connecter responsible for fraud, or may cause a connector to closed an account of a user responsible for fraud.

Figure 8:
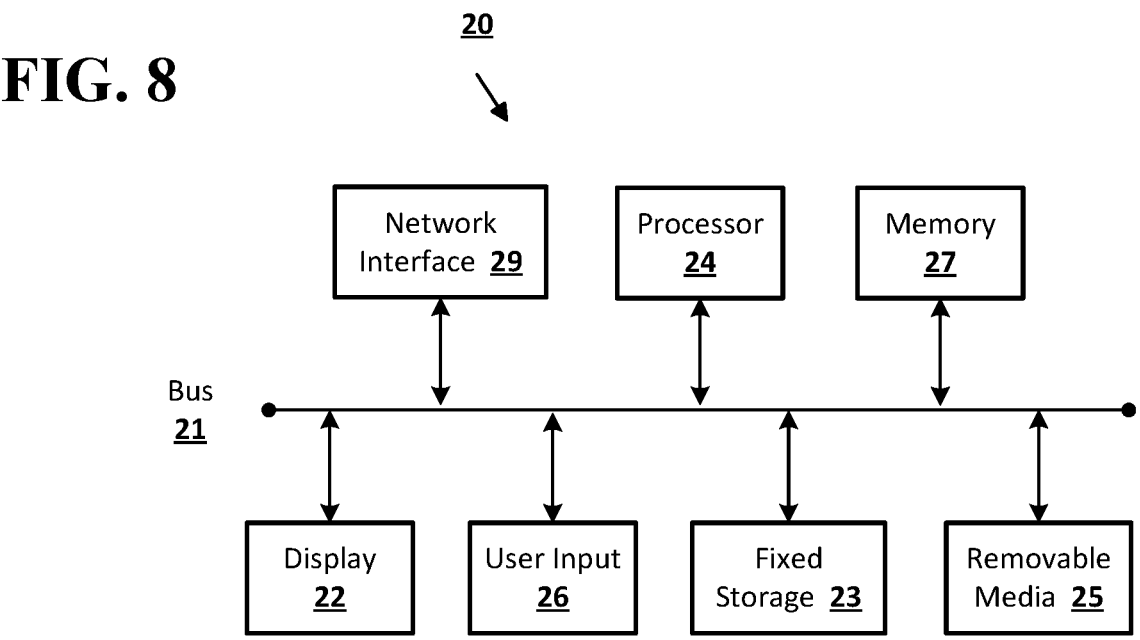
FIG. 8 shows a computer according to an embodiment of the disclosed subject matter.

Implementations of the presently disclosed subject matter may be implemented in and used with a variety of component and network architectures. FIG. 8 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection, or the like. For example, the network interface 29 may allow the computer to communicate with other computers via one or more local, wide-area, or other networks, as shown in FIG. 9.

Many other devices or components (not shown) may be connected in a similar manner (e.g., document scanners, digital cameras, and so on). Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, removable media 25, or on a remote storage location.

Figure 9:
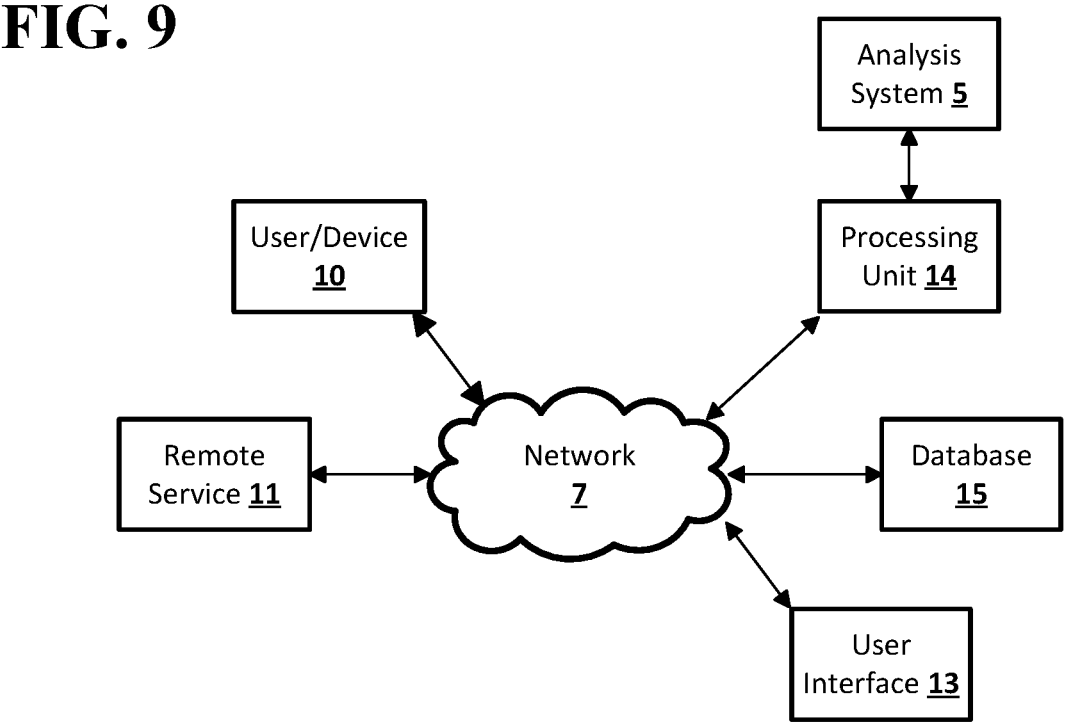
FIG. 9 shows a network configuration according to an embodiment of the disclosed subject matter.

FIG. 9 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
   receiving, at a computing device, payment data comprising an origin and a destination for a payment in an electronic payment network;
   estimating, by the computing device, a route of the payment in the electronic payment network based on the origin and the destination;
   generating, by the computing device, separate vector representations of each of two or more segments of the estimated route;
   inputting, by the computing device, each of the generated separate vector representations sequentially to an input layer of an encoder neural network of a neural network on the computing device;
   determining, by the computing device, using the neural network, one or more fraud probabilities based on inputting a hidden layer of the encoder neural network to a decoder neural network of a neural network after the separate vector representations of each of the two or more segments of the estimated route have been input to the input layer of the encoder neural network; and
   sending, by the computing device, an electronic communication to at least one ledger system or connector system in the estimated route causing the at least one ledger system or connector system to close or suspend an account of a user or suspend services usable through an account of a user based on the one or more fraud probabilities for the user.

2. The computer-implemented method of claim 1, further comprising:
   receiving a label for the payment data comprising one or more fraud probabilities comprising values indicating a probability of fraud in the payment in the electronic payment network;
   determining a level of error of the neural network based on a comparison of the fraud probabilities from the neural network and the fraud probabilities from the received label; and
   updating weights of the neural network based on the level of error of the neural network.

3. The computer-implemented method of claim 1, wherein each of the two or more segments comprises an indication of two ledger systems and one connector system.

4. The computer-implemented method of claim 1, wherein estimating a route of the payment in the electronic payment network based on the origin and the destination is further based on a known topology of the electronic payment network.

5. The computer-implemented method of claim 1, further comprising updating a risk score for at least one user, connector system, or ledger system in the estimated route based on a separate fraud probability for that user, connector system, or ledger system.

6. The computer-implemented method of claim 1, further comprising sending an electronic communication to at least one ledger system in the estimated route to cause the at least one ledger system to close or suspend an account of a connector system or suspend services usable through an account of a connector system based on a separate fraud probability for the connector system, reject the payment, or initiate a review of the payment.

7. The computer-implemented method of claim 1, wherein the origin comprises an identification of a first user and wherein the destination comprises and identification of a second user.

8. The computer-implemented method of claim 7, wherein the identification of the first user is a fingerprint comprising data associated with a computing device used by the first user to initiate the payment in the electronic payment network.

9. The computer-implemented method of claim 1, wherein the neural network further comprises a decoder neural network that receives output from the encoder neural network.

10. A computer-implemented system comprising:
    one or more storage devices;
    a communications device that receives payment data comprising an origin and a destination for a payment in an electronic payment network; and
    a processor that estimates a route of the payment in the electronic payment network based on the origin and the destination, generates separate vector representations of each of two or more segments of the estimated route, inputs each of the generated separate vector representations sequentially to an input layer of an encoder neural network of a neural network, and determines, using the neural network, one or more fraud probabilities based on inputting a hidden layer of the encoder neural network to a decoder neural network of the neural network after separate vector representations of each of the two or more segments of the estimated route have been input to the input layer of the encoder neural network, and wherein the communications device further sends an electronic communication to at least one ledger system or connector system in the estimated route causing the at least one ledger system or connector system to close or suspend an account of a user or suspend services usable through an account of a user based on the one or more fraud probabilites for the user.

11. The computer-implemented system of claim 10, wherein the processor further receives a label for the payment data comprising one or more fraud probabilities comprising values indicating a probability of fraud in the payment in the electronic payment network, determines a level of error of the neural network based on a comparison of the fraud probabilities from the neural network and the fraud probabilities from the received label, and updates weights of the neural network based on the level of error of the neural network.

12. The computer-implemented system of claim 10, wherein each of the two or more segments comprises an indication of two ledger systems and one connector system.

13. The computer-implemented system of claim 10, wherein the processor estimates the route of the payment in the electronic payment network further based on a known topology of the electronic payment network.

14. The computer-implemented system of claim of claim 10, wherein the processor further updates a risk score for at least one user, connector system, or ledger system in the estimated route based on a separate fraud probability for that user, connector system, or ledger system, wherein the risk score is stored in the one or more storage devices.

15. The computer-implemented system of claim of claim 10, wherein the communications device further sends an electronic communication to at least one ledger system in the estimated route to cause the at least one ledger system to close or suspend an account of a connector system or suspend services usable through an account of a connector system based on a separate fraud probability for the connector system, reject the payment, or initiate a review of the payment.

16. The computer-implemented system of claim of claim 10, wherein the origin comprises an identification of a first user and wherein the destination comprises and identification of a second user.

17. The computer-implemented system of claim of claim 16, wherein the identification of the first user is a fingerprint comprising data associated with a computing device used by the first user to initiate the payment in the electronic payment network.

18. A system comprising: one or more computers and one or more storage devices storing instructions which are operable, when executed by the one or more computers, to cause the one or more computers to perform operations comprising:
receiving payment data comprising an origin and a destination for a payment in an electronic payment network;
estimating a route of the payment in the electronic payment network based on the origin and the destination;
generating separate vector representations of each of two or more segments of the estimated route;
inputting each of the generated separate vector representations sequentially to an input layer of an encoder neural network of a neural network;
determining, using the neural network, one or more fraud probabilities based on inputting a hidden layer of the encoder neural network to a decoder neural network of the neural network after the separate vector representations of each of the two or more segments of the estimated route have been input to the input layer of the encoder neural network; and
sending an electronic communication to at least one ledger system or connector system in the estimated route causing the at least one ledger system or connector system to close or suspend an account of a user or suspend services usable through an account of a user based on the one or more fraud probabilites for the user.

19. The system of claim 18, wherein the instructions further cause the one or more computers to perform operations further comprising:
receiving a label for the payment data comprising one or more fraud probabilities comprising values indicating a probability of fraud in the payment in the electronic payment network;
determining a level of error of the neural network based on a comparison of the fraud probabilities from the neural network and the fraud probabilities from the received label; and
updating weights of the neural network based on the level of error of the neural network.

* * * * *